(12) United States Patent
Tsunekawa et al.

(10) Patent No.: US 6,348,975 B1
(45) Date of Patent: Feb. 19, 2002

(54) IMAGE PROCESSING APPARATUS, IMAGE PROCESSING METHOD, AND STORAGE MEDIUM

(75) Inventors: Kiyohiro Tsunekawa, Kawasaki; Akio Sugaya, Matsubushi-machi, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/251,413

(22) Filed: Feb. 17, 1999

(30) Foreign Application Priority Data

Feb. 18, 1998 (JP) .......................................... 10-035930
Jan. 18, 1999 (JP) .......................................... 11-008974

(51) Int. Cl.$^7$ ............................................. G06K 15/00
(52) U.S. Cl. ..................................... 358/1.17; 358/1.18
(58) Field of Search ............................... 358/1.1, 1.17, 358/1.18, 523, 524, 450; 707/505–508; 382/282–284; 345/536, 537, 538, 626, 629, 634, 635, 686, 544, 546, 550, 551

(56) References Cited

U.S. PATENT DOCUMENTS

| 4,868,552 | A | 9/1989 | Chang | 340/721 |
|---|---|---|---|---|
| 5,104,245 | A | 4/1992 | Orugi et al. | 400/68 |
| 5,715,382 | A | 2/1998 | Herrgods et al. | 395/117 |
| 5,737,501 | A | 4/1998 | Tsunekawa | 395/102 |
| 5,768,486 | A | 6/1998 | Sugaya | 395/116 |
| 6,064,404 | A | * | 5/2000 | Aras et al. | 358/116 |

FOREIGN PATENT DOCUMENTS

EP  0 458 612  11/1991

* cited by examiner

Primary Examiner—Arthur G. Evans
(74) Attorney, Agent, or Firm—Fitzpatrick, Cella, Harper & Scinto

(57) ABSTRACT

It is an object of the invention to read out and analyzes form data (macro data) upon printing, generate a drawing object, and reduce a processing time of a forming process for composing the drawing object to data to be overlaid. Particularly, it is an object to realize a developing process of form data in a color image processing apparatus. The invention provides an image processing apparatus for previously forming a form image from the form data and overlay-outputting the form image together with the data to be overlaid upon printing. Particularly, the object of the invention is accomplished by switching means for independently drawing into each plane buffer and means for drawing with respect to each plane for the image data of one page.

29 Claims, 18 Drawing Sheets

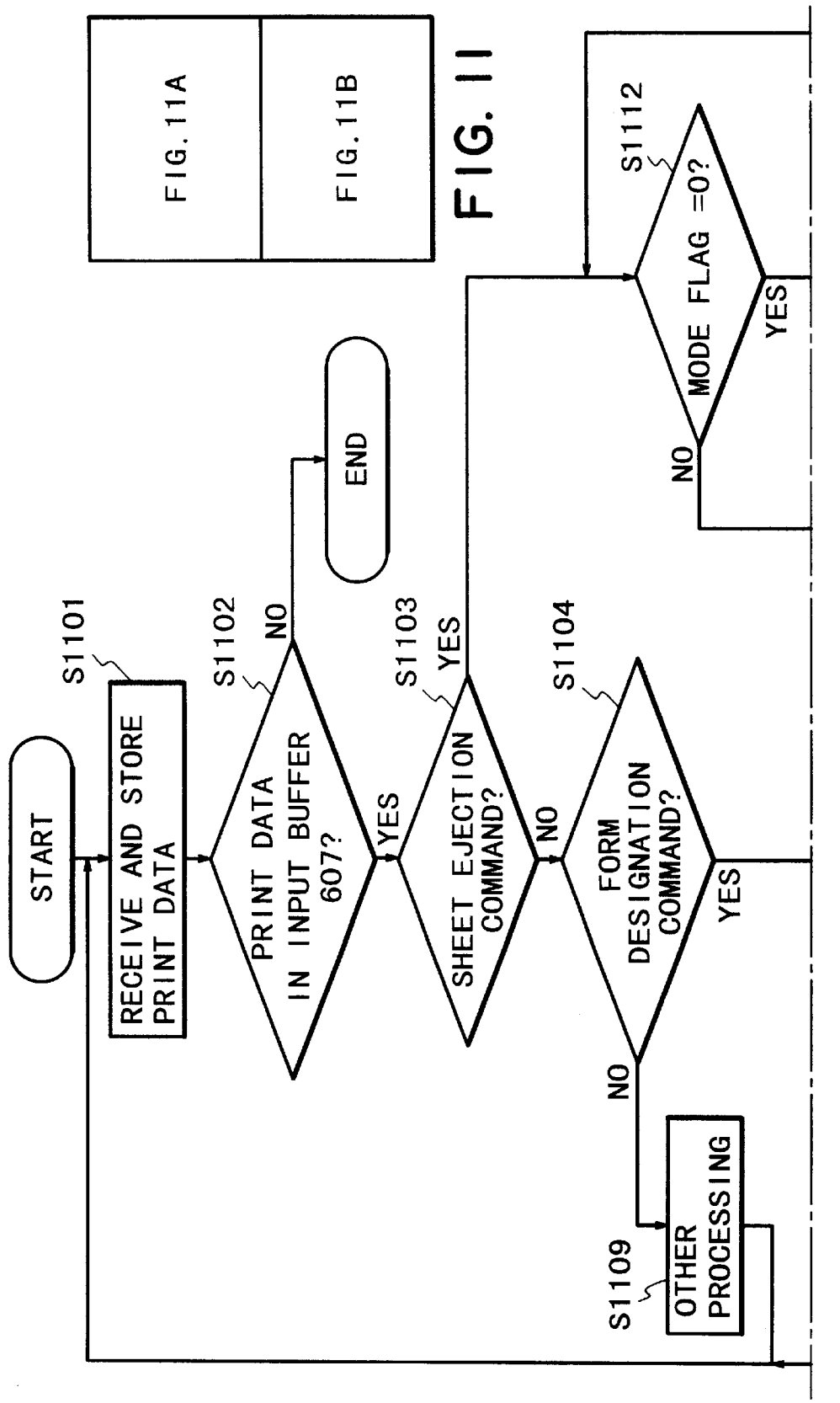

```
JOB START

RESOLUTION = 600 DPI

GRADATION = 1 BIT

SHEET DIRECTION = TRANSVERSE         ⎫
                                      ⎬ JL COMMAND
BINDING MARGIN = 5 MM

BINDING POSITION = LEFT

PDL SHIFT = LIPS                      ⎭

PDL DATA START                        ⎫

ENLARGEMENT/REDUCTION = 100%

SHEET SIZE = A4

FORM OVERLAY EXECUTION = FORM 1       ⎬ PDL COMMAND (DATA TO BE OVERLAID)

PDI DATA END                          ⎭

JOB END                               ⎬ JL COMMAND
```

PRINT DATA

FIG. 14

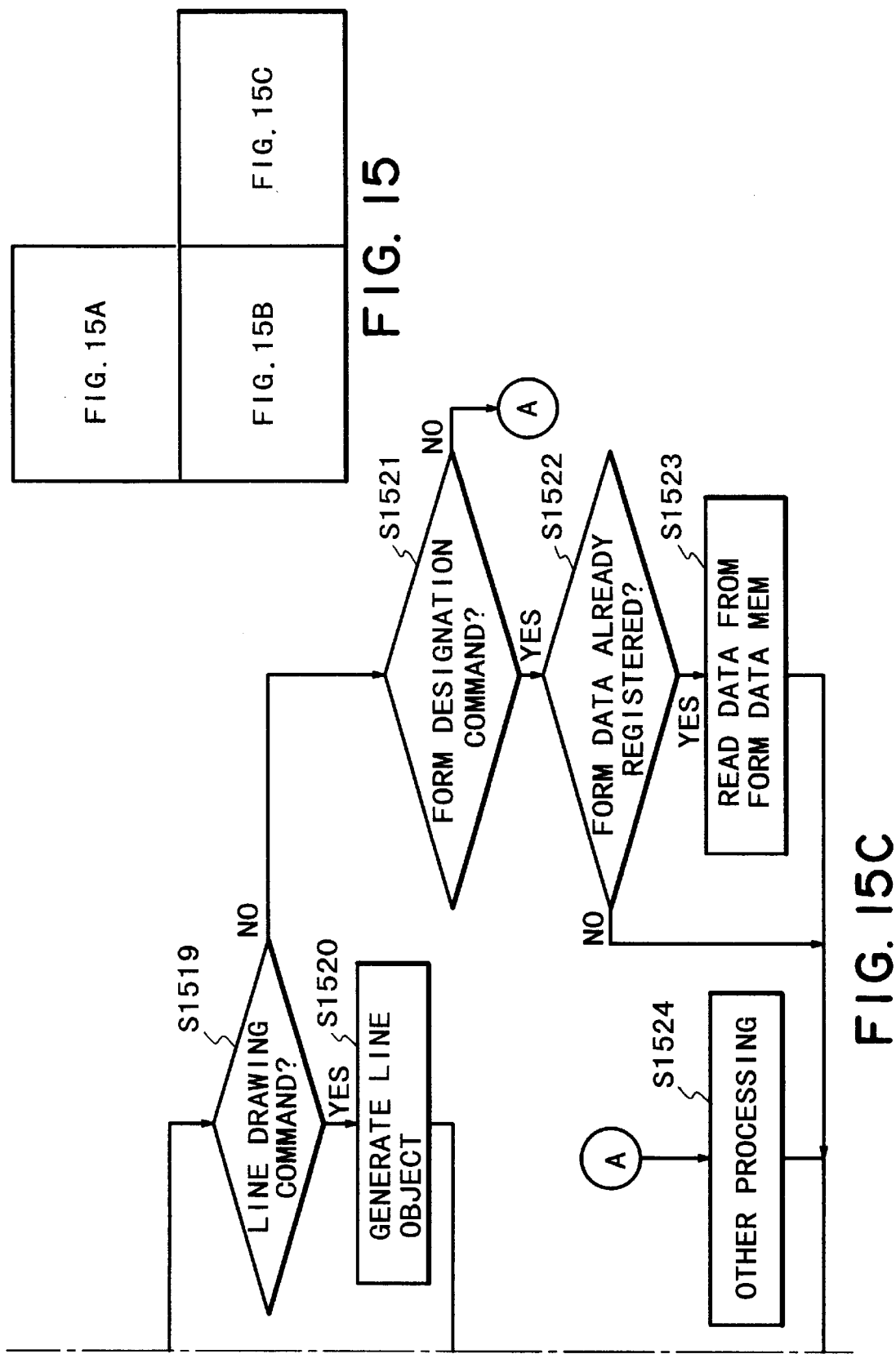

IMAGE PROCESSING APPARATUS, IMAGE PROCESSING METHOD, AND STORAGE MEDIUM

BACKGROUND OF THE INVENTION

1. Field of the Invention

The invention relates to an image processing apparatus, an image processing method, and a program storage medium. More particularly, the invention relates to an image processing apparatus, an image processing method, and a program storage medium for outputting image data formed by form overlay-processing normal page data and color form data of a plurality of plane images of different colors.

2. Related Background Art

In recent years, a demand to print a document and an image having a higher power of expression and a higher degree of appeal has been increasing for a page printer and a color page printer which can print in color has already been put into practical use. The color page printer is constructed so that page description languages such as color image data, color designation command, and the like can be interpreted. For example, by performing a predetermined color converting process to each of color drawing commands described by RGB, it is decomposed and converted into a plurality of color planes (for example, Y, M, C, Bk, etc.) and an image (raster image) is formed every color plane.

A video signal which reflects ON/OFF of bits of the raster image is area-sequentially transferred every color plane to a printer engine. A final image is formed on a recording paper by well-known latent image forming means, developing means, and fixing means. Such a color page printer has a plurality of color toner (for instance, yellow=Y, magenta=M, cyan=C, black=Bk) corresponding to the respective planes and forms an image onto the recording paper by overlaying the image of each plane by each toner.

A raster image forming procedure of each plane in a conventional color image processing apparatus will now be described hereinbelow with reference to FIGS. 3, 4, and 5. For simplicity of explanation, a case of outputting a video signal as much as one page in a lump after a raster memory of one page was formed (full painting system) will now be described. However, the same shall also similarly apply to a case where one page is divided into a plurality of bands and raster images of the subsequent bands are sequentially formed simultaneously with a video transfer (banding system). It is now assumed that a case where there is an instruction to draw a character "A" in red color by a page description language inputted from the outside is shown here. Reference numerals 301, 302, 303, and 304 in FIG. 3 denote raster memories (page buffers) of one page of each plane of Y, M, C, and Bk. FIG. 4 shows a structure of a drawing object to generate the raster image in FIG. 3. The drawing object here denotes an intermediate data format at the stage before a final raster image is formed and it is now assumed that it is a bit map pattern corresponding to a character code "A".

First, to express red in a color space of YMCBk, since it is sufficient to set (Y:M:C:Bk=1:1 0:0), as shown in FIG. 3, the character "A" is drawn into each plane of Y and M (the bit at the corresponding position in the raster memory is set to ON).

On the other hand, for each plane of C and Bk, it is necessary to set the character "A" to a blank space (the bit at the corresponding position in the page buffer is set to OFF). This is because if the bit at the position where the character "A" should be drawn has already been set to ON by a different drawing object, when the images of the respective planes are overlaid on the recording paper, the red color is not correctly reconstructed.

In FIG. 4, reference numeral 404 denotes a font object constructed by: a bit map pattern (406) of the character "A"; and an information portion (405) in which information such as width, height, and the like of the pattern has been stored. Reference numeral 401 denotes a drawing instruction information portion in which information to discriminate at which position in the page the font object should be drawn has been stored.

The font pattern 406 is formed, for example, from scalable font data by a font scaler (not shown) on the basis of information such as font, character size, character code, and the like instructed by the page description language. On the other hand, the drawing information 401 has color information (403) besides information (402) such as head address (addr) on the memory of the font object, drawing position (x, y) in the page where the writing of the drawing object is started, and the like. The color information 403 consists of four bits here and to which plane the drawing object is drawn among the YMCBk planes, namely, the bit of the raster image of which plane is set to "1" is instructed by the contents of each bit. In the diagram, the bits sequentially correspond to Y, M, C, and Bk from the head bit. Therefore, the diagram shows that if head two bits among four bits of the color information are set to "1", when the font pattern 406 is drawn to each plane of Y and M, the bit at the corresponding position on the page buffer is set to "1". Since the third and fourth bits of the color information are equal to 0, for the corresponding C and Bk planes, the bits in the page buffer at the position corresponding to the font pattern are set to "0".

In the drawing process, since a range where the bits of each plane are rewritten lies at only the portions where the bits of the font pattern 406 are set to "1", the font object is called a mask object and the color information 403 is handled as a background of a mask, namely, a background.

For simplicity, the explanation has been made here on the assumption that the background 403 is bit information merely showing the presence or absence. However, a dither pattern to express a halftone color can be also used (FIG. 5). In this case, the color information has a different dither pattern every plane. Head addresses (BG_addr) of those dither patterns are set as color information 503. For example, the dither pattern is set to a fixed pattern of (32×32) dots and a dither pattern in which all bits are set to "0" is used for the plane which is overwritten in white. In FIG. 5 a construction other than the color information 503 is substantially the same as the construction of FIG. 4.

In a printing such as a general work or the like, on the other hand, in many cases, there is used a form overlay printing such that a regular form portion (hereinafter, referred to as form data) like a slip or a regular document in which the contents of a plurality of pages are identical like a title, a frame line, or the like and an irregular data portion (hereinafter, referred to as data to be overlaid) like numbers, names, or the like in a table in which the contents differ every page are overlaid and printed.

In a conventional page printer in which a page description language is analyzed and a corresponding raster image is formed, both of the form data and the data to be overlaid are described by a page description language format and the printing of the regular form portion is realized by registering and executing the form data as a macro command. That is, a command group of the page description languages to draw individual frame line, title characters, and the like constructing the form is preliminarily registered as one or a plurality of macro commands into a memory area of the printer and by executing the macro command (group) each time the page changes, the form overlay printing is realized.

The execution of the macro command will now be described in detail hereinbelow.

According to the macro command which has already been registered in the memory area (free RAM or the like) of the printer, at the time of the designation of the macro (=execution of the first time) and after completion of the analysis of the data to be overlaid as much as one page, for example, each time a sheet ejection command is received (=execution of the second time and subsequent times), the registration contents, namely, the command group of the page description language constructing the form are read out from the memory area and are analyzed by page description language analyzing means in a manner similar to the data to be overlaid of the normal page. After that, a drawing object as an intermediate code to form a raster image of one page is generated. It is sufficient to perform the generating process of the drawing object in substantially the same manner when the data to be overlaid is processed.

There is also a case where prior to executing the printing, the form data is previously transferred from the host computer to the printer and is registered as macro data into a non-volatile memory such as a flash memory or the like, a non-volatile external storage device such as a hard disk or the like, or a volatile memory such as an RAM or the like, thereby making it unnecessary to transfer the form data every time. In this case, at the time of the print execution, only a macro designation command to instruct the macro data in the flash memory, hard disk, or RAM by a number or the like is sent. It will be obviously understood that when the form data is registered into the RAM, after a power source of the printer was once turned off, the macro designation command is invalid, however, when the form data is registered into the flash memory or the like, even after the power source was again turned on, the macro designation command is valid.

The foregoing conventional technique, however, has problems which will be explained hereinbelow.

That is, in the conventional image processing apparatus, since the form data has been registered by a page description language format, at each page to be subjected to a form overlay, the same form data (macro data) is read out and analyzed and a drawing object is generated. When the contents of the form data are complicated, therefore, it takes long time for the analysis of the regular form portion and the generation of the drawing object every page. That is, as the drawing contents of the regular form portion become more complicated, the processing time of the form portion further increases.

In case of performing an overlay printing of a plurality of pages by using the same form data, the same macro (command group) is analyzed every time and every page and the same drawing object is generated, so that there is a problem such that irrespective of the form of the same contents, a printing speed of the second and subsequent pages is not improved.

Further, since the same drawing object is generated every page and the drawing object is not shared among a plurality of pages, a capacity of a memory necessary for the drawing process increases and there is also a fear of deterioration of performance such as a waiting of a sheet ejection or the like.

Particularly, in the case where a complicated form including a figure, an image, or the like is overlay designated and an error such as shortage of a drawing memory or the like occurs, the same error occurs in all of the pages subjected to the form overlay. Therefore, it is important to solve the above problems.

SUMMARY OF THE INVENTION

As one of the means for solving the above problems, there is considered a method whereby form data is preliminarily rasterized and is held as image data, namely, form image into a memory area in a printer and, at the time of an overlay printing, the form data is outputted at a high speed without needing to perform an analysis and a rasterization of the form data (hereinafter, referred to as a pre-rasterizing system).

In the pre-rasterizing system, in page in which the overlay designation has been performed, after the form image was copied into a band buffer, by merely analyzing and rasterizing the normal page data, the overlay drawing can be performed. Since a memory of a large capacity is needed to hold the form image of one page (a memory of about 8 MBytes is necessary in case of the image of the A3 size, a resolution of 600 dpi, and monochromatic color), after the form image was compressed by the encoding means, it is held in the memory area of the printer and when it is copied into the band buffer, the compressed image is decoded.

According to the pre-rasterizing system as mentioned above, the bit map image which was once rasterized is again drawn into the band buffer, thereby drawing the form image. Therefore, it ought to be difficult to apply the pre-rasterizing system to the conventional color image processing apparatus for outputting a color image by using a plurality of planes.

This is because, in the conventional color image processing apparatus, as described in the conventional technique, when an individual drawing object such as character, figure, or the like is drawn, for a plane which is unnecessary to be drawn, the same contents as those of the plane which needs to be drawn are drawn in white (namely, erased), thereby drawing in correct color according to the designation, and when form images which have previously been separated into different planes are again drawn in a memory, the other planes are drawn in white and a problem such that parts of planes of the form image are erased occurs. For example, to express a red form image, (Y:M:C:Bk=1:1:0:0) and the form image is separated into two planes of Y and M and stored into a memory. This is because when the image is again drawn into the band buffer from the planes of Y and M, if the plane of M is drawn after completion of the drawing of the Y plane, the Y plane which was first drawn is deleted by white, so that the form image of only magenta (M) is derived. It is, therefore, an object of the invention to provide image processing apparatus and method and a program storage medium, in which only form images which have previously been separated into different planes can be individually drawn without exerting any influence on the other planes.

To solve the above problems, according to the present invention, there is provided an image processing apparatus comprising: memory means having plane buffers to store a plurality of plane images; first drawing means for independently drawing image data into each plane buffer on the basis of a print command; and second drawing means for drawing the image data into the plane buffers in which the drawing is necessary and erasing data at the positions of the image data in the planes in which the drawing is unnecessary on the basis of a print command, wherein the first drawing means and the second drawing means can be switched.

Further, to solve the above problems, according to the invention, there is provided an image processing apparatus which can overlay-output form data of one page and print data which is written to a predetermined position of a form, comprising: form data memory means for storing the form data of at least one page; form image forming means for reading out the form data from the form data memory means and analyzing the form data and forming a form image of one page every plane; form image holding means for holding the form image of at least one page; and form drawing means for drawing the form image held in the form image holding means into an output memory of the corresponding plane, wherein image data is drawn into the output memory together with the form image on the basis of the print data.

Further, to solve the above problems, according to the present invention, there is provided an image processing method of controlling an image processing apparatus having memory means having plane buffers to store a plurality of plane images, comprising: a first drawing step of independently drawing image data into each plane buffer on the basis of a print command; and a second drawing step of drawing the image data into the plane buffers in which the drawing is necessary and erasing data at the positions of the image data in the planes in which the drawing is unnecessary on the basis of a print command, wherein the image data is drawn by switching the first drawing step and the second drawing step.

Further, to solve the above problems, according to the invention, there is provided an image processing method of overlay-outputting form data of one page and print data which is written to a predetermined position of a form, comprising: a form data storing step of storing the form data of at least one page into form data memory means; a form image forming step of reading out the form data from the form data memory means and analyzing the form data and forming a form image of one page every plane; a form image holding step of holding the form image of at least one page into the form image holding means; and a form drawing step of drawing the form image held in the form image holding means into an output memory of the corresponding plane, wherein image data is drawn into the output memory together with the form image on the basis of the print data.

Further, to solve the above problems, according to the present invention, there is provided a program storage medium in which an image processing program for controlling an image processing apparatus having memory means having plane buffers to store a plurality of plane images has been stored, wherein the program comprises: a first drawing step of independently drawing image data into each plane buffer on the basis of a print command; and a second drawing step of drawing the image data into the plane buffers in which the drawing is necessary and erasing data at the positions of the image data in the planes in which the drawing is unnecessary on the basis of a print command, and wherein the image data is drawn by switching the first drawing step and the second drawing step.

Further, to solve the above problems, according to the invention, there is provided a program storage medium in which an image processing program for controlling an image processing apparatus to overlay-output form data of one page and print data which is written to a predetermined position of a form has been stored, wherein the program comprises: a form data storing step of storing the form data of at least one page into form data memory means; a form image forming step of reading out the form data from the form data memory means and analyzing the form data and forming a form image of one page every plane; a form image holding step of holding the form image of at least one page into the form image holding means; and a form drawing step of drawing the form image held in the form image holding means into an output memory of the corresponding plane, and wherein image data is drawn into the output memory together with the form image on the basis of the print data.

With the above construction, according to the invention, a color form overlay can be outputted at a high speed irrespective of the contents of the form data. Particularly, in a print command of a plurality of pages such that a normal page differs every page for the form data of the same contents, a form data processing time of the second and subsequent pages can be set to almost "0".

As for a regular form portion, since there is no need to individually have the same drawing object every plurality of pages, the memory which is required for the drawing objects of a plurality of pages can be totally suppressed and the reduction of the processing speed such as a sheet ejection waiting or the like can be avoided.

According to the invention, the form image is formed, encoded, held, and sequentially decoded every color plane on a unit basis of the units obtained by dividing one page into bands and, after that, it is read out and drawn into the band buffer. Therefore, a pre-process or a skip reading process is made unnecessary upon decoding. The invention can be easily applied to an image processing apparatus for drawing normal page data by the banding method.

BRIEF DESCRIPTION OF THE DRAWINGS

FIG. 14 is a diagram showing an example of the contents of a form overlay execution print command in the embodiment.

DETAILED DESCRIPTION OF THE PREFERRED EMBODIMENTS

[First Embodiment]

The first embodiment of the invention will now be described hereinbelow with reference to the drawings.

Figure 1:
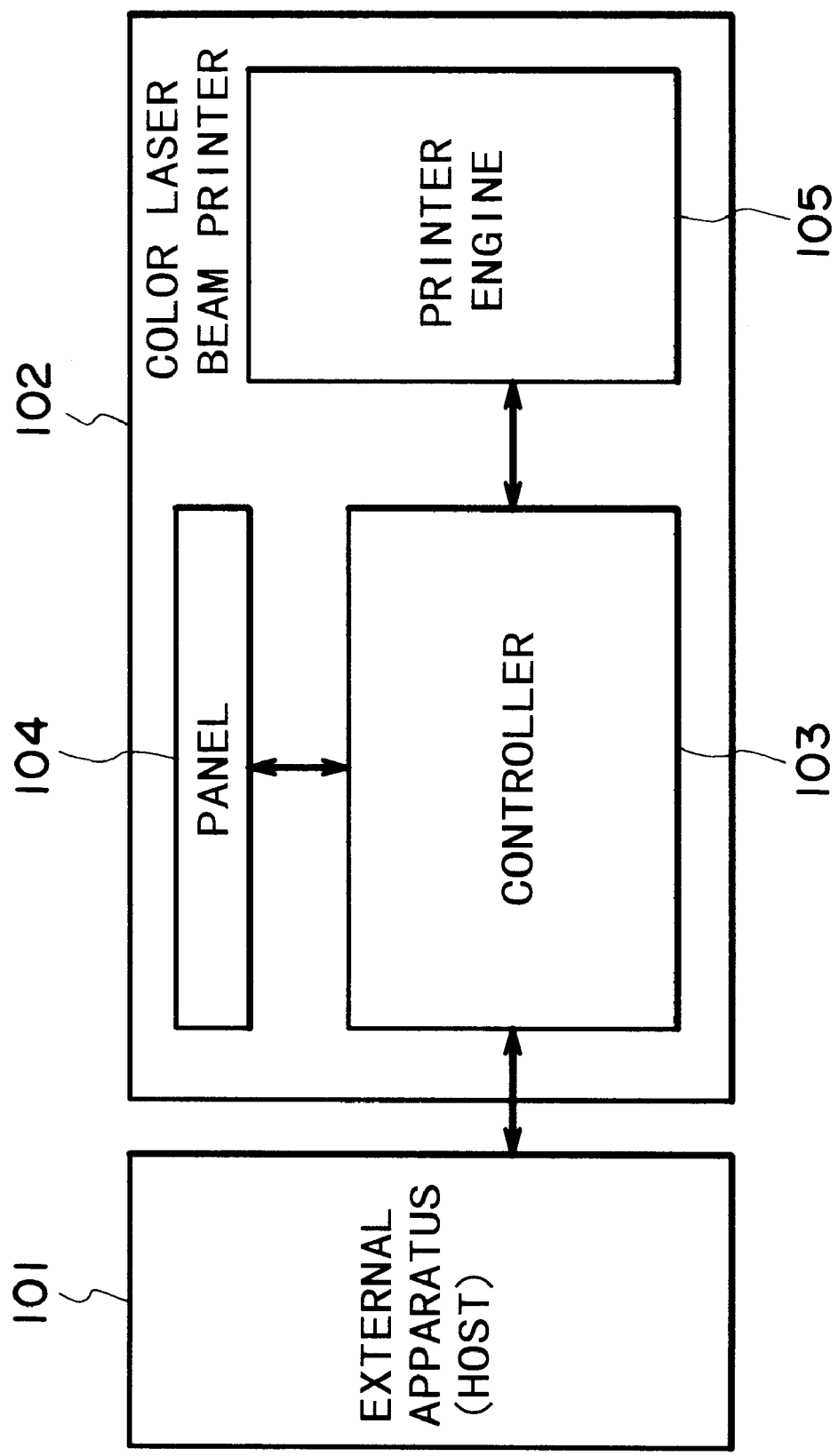
FIG. 1 is a block diagram showing a schematic construction of a color laser beam printer to which the invention can be applied.

First, a construction of a color image processing apparatus suitable for applying the invention will be described with reference to FIGS. 1 and 2. FIG. 1 is a block diagram showing a schematic structure of the color image processing apparatus to which the invention can be applied and, for example, shows a case of a laser beam printer. It will be obviously understood that the image processing apparatus to which the invention can be applied is not limited to the laser beam printer but can be applied to printing apparatuses of the other printing systems.

In FIG. 1, reference numeral 101 denotes an external apparatus such as a host computer or the like and 102 a main body of a color laser beam printer to which the embodiment is applied.

The color laser beam printer 102 is constructed so as to receive print data (character codes, figure data, etc.) or image data of a page description language format from the external apparatus 101, form a corresponding character pattern, figure pattern, or the like in accordance with those information, and form an image onto a recording paper as a recording medium.

Reference numeral 105 denotes a printer engine for actually forming a latent image onto a photosensitive drum every dot data (image data) of each color of Y, M, C, and Bk, overlaying the images of four colors of Y, M, C, and Bk onto the print sheet, and thermally fixing them, thereby printing.

Reference numeral 103 denotes a printer control unit (hereinafter, referred to as a controller) for performing a whole control of the laser beam printer 102 and analyzing character information or the like which is supplied from the host computer. The controller 103 is connected to the printer engine 105, analyzes the print data which is supplied from the external apparatus 101, forms page information comprising dot data of each color of Y, M, C, and Bk based on the print data, and sequentially transmits the dot data (video signal) to the printer engine 105.

Reference numeral 104 denotes an operation panel on which switches for operation, an LED display, and the like are arranged. By operating the panel 104, the operator (user) can perform a designation of a predetermined operation, a setting of a print environment, and the like for the color laser beam printer 102.

Figure 2:
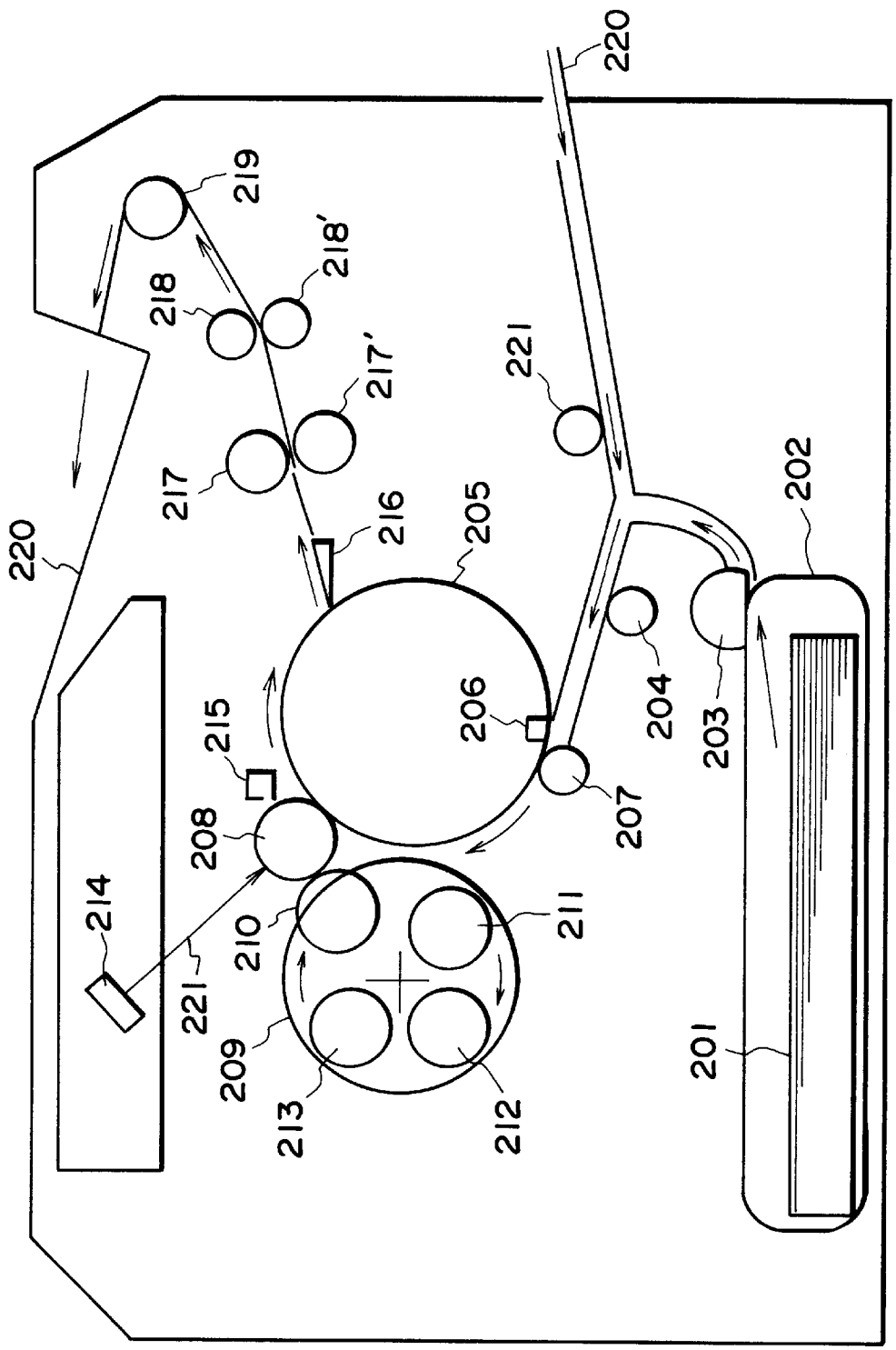
FIG. 2 is a cross sectional view showing an internal structure of a printer engine of a color image processing apparatus shown in the first embodiment of the invention.
Figure 3:
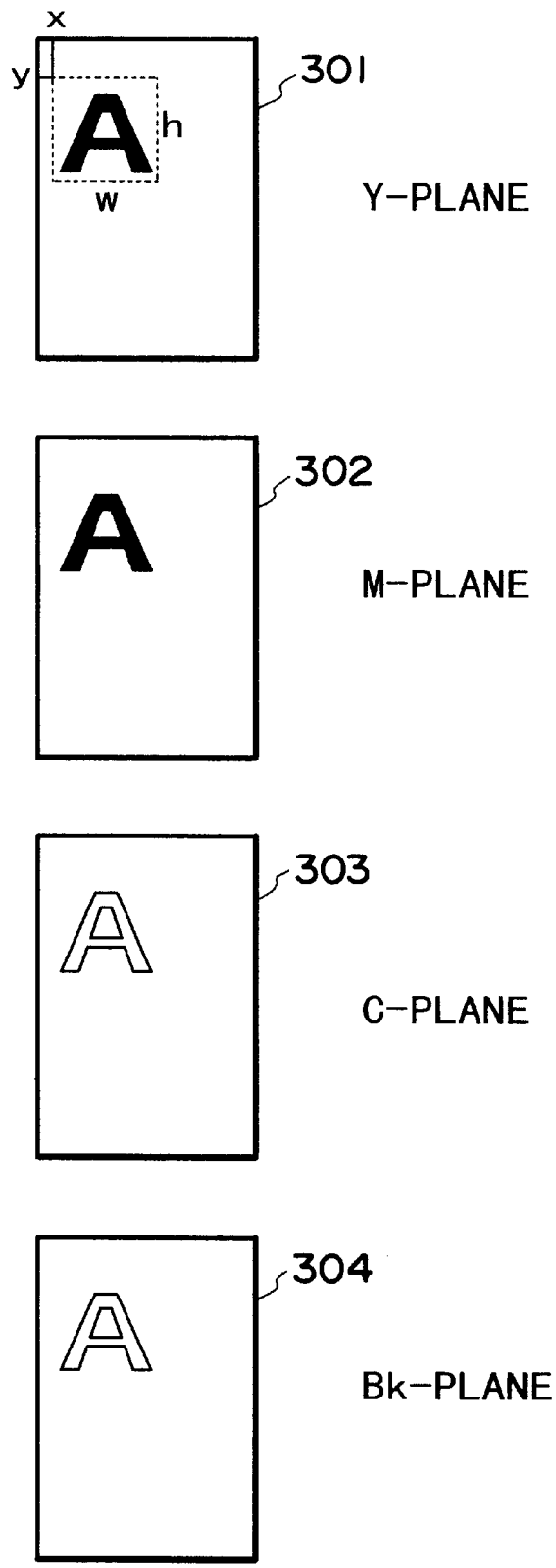
FIG. 3 is a schematic diagram showing a raster image formation of each plane in a conventional color image processing apparatus.

FIG. 2 is a cross sectional view showing an internal structure of the printer engine 105 of the color laser beam printer 102 in the embodiment.

In the diagram, reference numeral 201 denotes a print sheet as a recording medium; 202 a sheet cassette to hold the print sheets 201; and 203 a cassette sheet feed clutch serving as a cam for separating only one top print sheet among the print sheets 201 put on the sheet cassette 202 and conveying a front edge portion of the separated print sheet to a position of a sheet feed roller 204 by driving means (not shown). The clutch 203 intermittently rotates every sheet feeding operation and feeds one print sheet in correspondence to one rotation. When the print sheet is conveyed by the sheet feed clutch 203, the sheet feed roller 204 rotates while lightly pressing the print sheet 201, thereby conveying the print sheet 201.

Reference numeral 220 denotes a sheet insertion tray and 221 indicates a manual sheet feed clutch for enabling not only the print sheets to be fed from the sheet cassette 202 but also the print sheets to be manually fed from the sheet insertion tray 220 one by one.

Reference numeral 205 denotes a transfer drum; 206 a gripper to sandwich the front edge of the print sheet; and 207 a conveying roller. The transfer drum 205 rotates at a predetermined speed. When the gripper 206 on the transfer drum 205 arrives at the position of the front edge of the print sheet, the gripper sandwiches the front edge portion of the print sheet. The print sheet 201 is wound around the transfer drum 205 and conveyed by this sandwiching operation and the conveying roller 207.

Reference numeral 208 denotes a photosensitive drum; 209 a developer supporter; 210 a yellow toner developer; 211 a magenta toner developer; 212 a cyan toner developer; and 213 a black toner developer.

The developer supporter 209 rotates and conveys the developer of the toner of a desired color to a position of the photosensitive drum 208 where the image can be developed.

Reference numeral 214 denotes a laser driver to drive a semiconductor laser (not shown). The laser driver 214 turns on/off the semiconductor laser in accordance with the dot data (video signal) which is transmitted from the printer controller 103, thereby on/off switching a laser beam 224 which is emitted from the semiconductor laser.

The laser beam 224 forms an image on the photosensitive drum 208 and is swung to the right and left by a rotary polygon mirror (not shown), thereby scanning in the main scanning direction and forming a latent image on a main scan line. At the same time, the photosensitive drum 208 is rotated synchronously with the position of the print sheet 201 on the transfer drum 205. By the above operation, an electrostatic latent image of one page by the exposure of the laser beam is formed on the surface of the photosensitive drum 208 charged by a charging device (not shown). The latent image on the photosensitive drum 208 is developed as a toner image by the developer of a predetermined color toner in the developers 210 to 213 and, after that, the toner image is transferred onto the print sheet 201 on the transfer drum 205.

Further the toner images are overlaid onto the print sheet 201 on the transfer drum 205 by only the number of times of the necessary color toner. The print sheet 201 onto which the necessary toner image has been transferred is separated from the transfer drum 205 by a transfer separating claw 216. The toner image is thermally fixed by fixing rollers 217 and 217' and passes through conveying rollers 218, 218', and 219 and is ejected onto a sheet ejection tray 230.

In the color laser beam printer 102 of the embodiment, the processes of the formation and transfer of the latent image are executed in accordance with the order of yellow, magenta, cyan, and black.

Since each of the yellow toner developer 210, magenta toner developer 211, cyan toner developer 212, and black toner developer 213 is formed like a casing of a cassette type and is detachable from the main body, the developers 210, 211, 212, and 213 are simply referred to as a Y cartridge, an M cartridge, a C cartridge, and a Bk cartridge hereinbelow, respectively.

Figure 6:
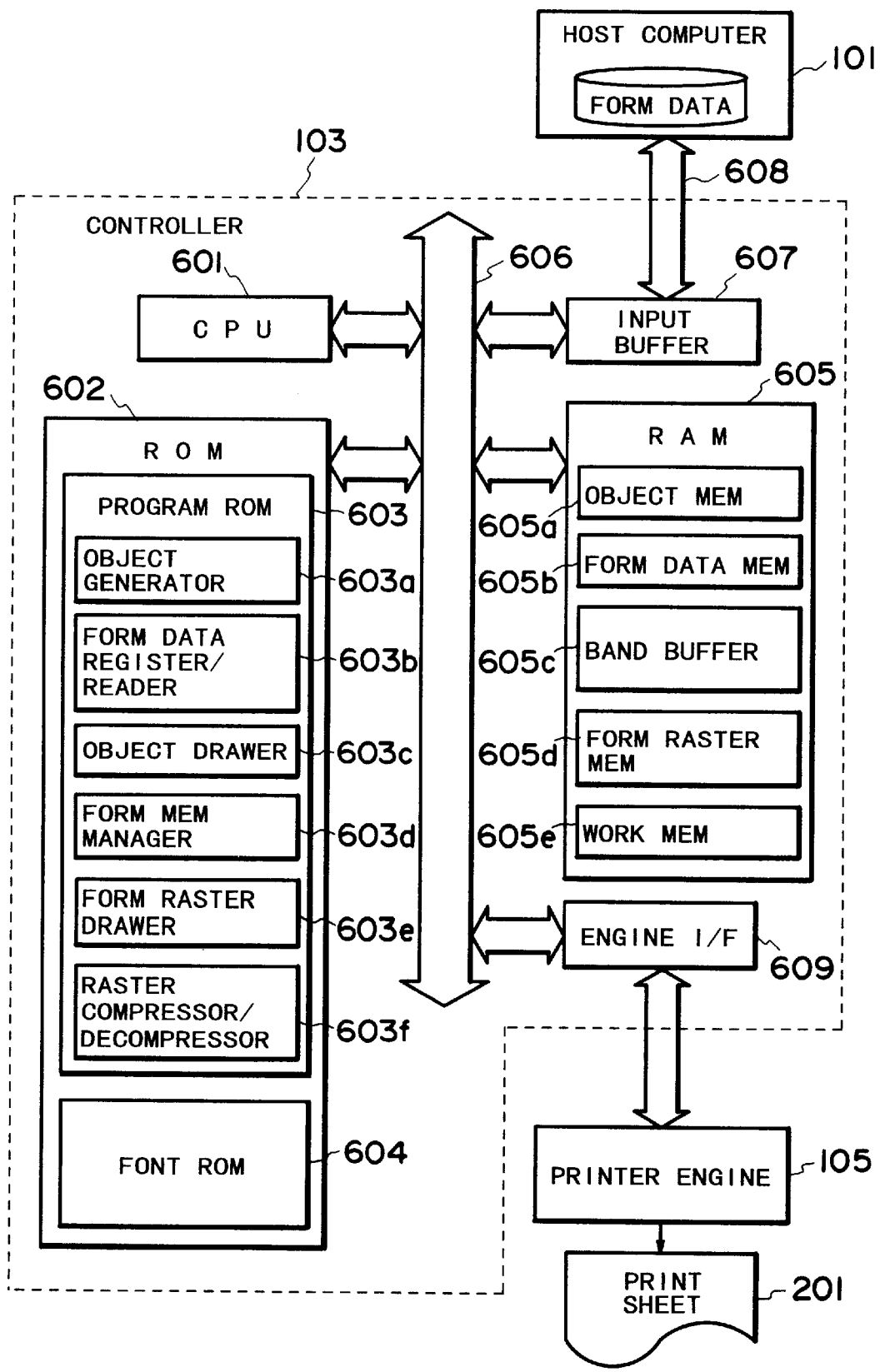
FIG. 6 is a block diagram for explaining a fundamental construction of a controller of the image processing apparatus shown in the first embodiment.

FIG. 6 is a block diagram for explaining a fundamental construction of a color image processing apparatus showing the first embodiment of the invention and shows an internal construction of the controller 103 of the color image processing apparatus in FIG. 1. The invention can be applied to a single apparatus or a system in which processes are executed through a network such as an LAN or the like so long as the functions of the invention are executed.

In the diagram, the printer controller 103 is connected to the external host computer 101 through a predetermined interface 608 and executes a predetermined printing process in accordance with the print data which is sent from the host computer 101. The print data received from the host computer 101 is temporarily stored as reception data into an input buffer 607.

The form data described by a page description language format has previously been stored as a file in a hard disk or the like of the host computer 101. At the time of a form overlay printing, the form data is added as overlay registration data (macro command) to normal page data and the resultant data is transmitted. It is assumed that the individual form data on the host computer is managed by a file name which can be unconditionally identified.

Reference numeral 601 denotes a printer CPU for systematically controlling accesses to various devices connected to a system bus 606 on the basis of a control program 603 stored in an ROM 602 as a read only memory. First, the print data stored in the input buffer 607 is analyzed. A drawing object of at least one page is generated (an object generator 603a). Subsequently, a raster image (image data) of one page (or one band obtained by dividing into a plurality of bands) is formed on the basis of the drawing object (an object drawer 603c: also referred to as image data drawing means). Further, the video signal according to on/off of the bits of the raster image is outputted to the printing unit (printer engine) 105 through an engine interface 609 (an output of the video signal is referred to as a "ship" hereinbelow). The printer engine 105 prints the image onto the print sheet 201 on the basis of the video signal received from the CPU 601.

The banding system in which a plurality of band rasters obtained by dividing a page into bands are prepared is constructed so as to simultaneously perform the formation of the raster image and the shipping operation. That is, while shipping one band raster which has already been drawn, a drawing object belonging to the other band raster is drawn.

The control program 603 is constructed by a program to realize the following functions besides the above construction.

That is, the control program 603 is constructed by: a form data register/reader 603b for registering the form data described by the page description language into an RAM 605 (which will be explained hereinlater) in the case where the print data in the input buffer 607 is a form data registration command and for reading out the form data when a form overlay designation command is received; the object drawer 603c for generating a form raster on the basis of the read-out form data; a form memory manager 603d for storing and holding the form raster into the RAM 605; and a form raster drawer 603e for overlaying the form raster to the normal page data and drawing resultant data into a page memory 605c. The form memory manager 603d has a cache function such that whether the form raster corresponding to the requested form data has already been stored in a form raster memory 605d or not is discriminated and, if it has already been stored, the stored form raster is used without reading out the form data from a form data memory 605b. The ROM 602 is also used as a memory to store font data constructed by dot fonts or scalable fonts which are used to output characters (font ROM 604).

Reference numeral 605 denotes the RAM which functions as a main memory, a work memory, or the like of the CPU 601 and can expand a memory capacity by an option RAM which is connected to an expansion port (not shown). The RAM 605 is used as: an object memory 605a to store the drawing object; a work memory 605e which is temporarily used by the control program 603; band buffer (or page buffer) 605c to store a raster image corresponding to two pictures of the band area obtained by dividing one page into bands (or raster image of one page); form data memory 605b to store the form data described by the page description language; and form raster memory 605d to store the form raster. The RAM 605 is also used as a cache memory (not shown) to cache a character pattern developed on the basis of scalable data in the font ROM 604, a print environment data storing memory (not shown), and the like. It is now assumed that the band buffer 605c is shared by each plane of Y, M, C, and Bk.

An electric power is supplied from a power source (not shown) to the laser beam printer 102. Although the explanation has been made on the assumption that the form data is stored into the RAM 605, the form data can be also previously registered and stored into a non-volatile memory such as a flash memory or the like.

Although the explanation has been made on the assumption that the apparatus constructing the invention is supplied as a program stored in the ROM, the invention is not limited. It is also possible to construct in a manner such that the control program is supplied by a medium such as floppy disk, hard disk, or the like and is loaded into the RAM or the like prior to execution and, after that, the program is executed. The invention can be also embodied by installing the control program from a storage medium such as CD-ROM, CD-R, memory card, DVD, or the like through a drive (not shown) and controlling it. Claims of the present invention also incorporate such an embodiment.

Subsequently, a registering procedure of the form data and form raster in the image processing apparatus with the above construction will now be described hereinbelow with reference to a flowchart of FIG. 7.

In the diagram, according to the control program 603, in step S701, the print data which is sent from the host computer 101 is stored into the input buffer 607 through the predetermined interface 608 as input means. Subsequently, the CPU 601 discriminates whether the print data exists in the input buffer 607 or not (step S702). If it does not exist, the processing routine is finished. When the print data exists, the print data is analyzed in step S703 and subsequent steps.

In step S703, a check is made to see if the print data is a form data registration command. If YES, the form data corresponding to the size instructed as a parameter of the form data registration command is read out from the input buffer and written into the form data memory 605b (step S704). The processing routine is returned to step S701 in order to read out the subsequent print data from the input buffer 607.

As a parameter of the form data registration command, a form number (form ID) which can unconditionally discriminate the form contents is designated in addition to the form data size. By making the form ID correspond to the form data on the host computer side and managing, the form data of different contents can be distinguished.

In steps S703 and S704, the form data as much as the size instructed as a parameter of the form data registration command has been registered. It is also possible to construct in a manner such that the head and end of the form data are instructed by two commands of an overlay registration start command and an overlay registration end command. In this case, to discriminate whether the form data is being registered or not, a flag which is reset to "0" when a power source is turned on or the like is prepared, the flag is set to "1" when the overlay registration start command is received, and in the case where the flag has been set to "1", it is decided that the form data is being registered, and the flag is reset when the overlay registration end command is received.

In the case where the form data memory is constructed in the non-volatile memory such as a flash memory or the like and the form data is preliminarily registered before the print data is received, there is no need to execute the processes in steps S703 to S704. Processes in this case will be explained in the second embodiment.

When it is determined in step S703 that the print data is not the form data registration command, a check is made in subsequent step S705 to see if the print data is the form raster registration command. If it is decided that the print data is the form raster registration command, the form raster is registered in step S706 and subsequent steps. That is, a check is made to see if the form raster corresponding to the form data has been registered in the form raster memory 605d (step S706). If it is not registered yet, in subsequent step S707, the form data is read out from the form data memory 605b and the drawing object corresponding to each print data in the form data is generated by the object generator 603a. It is sufficient to execute the generating process of the drawing object in step S707 in a manner similar to the processes for analyzing the data to be drawn in the normal page and generating the drawing object.

When it is determined in step S706 to see if the form raster corresponding to the form data has already been registered in the form raster memory, the processing routine is returned to step S701 in order to analyze the subsequent print data.

In step S707, the drawing object is generated and, at the same time, management information (hereinafter, form information) to identify the form is also temporarily stored into the work memory. The form ID (which is designated by the host) which is unconditionally determined every form, a sheet size, a printing direction of the print sheet, a data formation resolution, a color mode (gradation), and the like are included in the form information.

In step S708, after the form raster was formed by the object drawer 603c, the form image is encoded by a raster encoder 603f and, further, the encoded form image and the form information which was temporarily stored in the work memory are stored into the form raster memory 605d (this storage is performed by the form memory manager 603d). The process in step S708 is executed with respect to all of the planes of YMCBk. After the form rasters of all of the planes were registered (step S709), the generated drawing object is cleared (step S711) and the processing routine is returned to step S701.

In the embodiment, it is assumed that the form raster to be formed in the above step is formed and stored in a state where one page is divided into a plurality of bands and a division height is set to a value that is (1/integer) time as high as a possible height of the band buffer 605c. In other words, in the case where the band buffer 605c can be set to three stages of the heights of 256 dots, 512 dots, and 1024 dots by the installed memory, it is sufficient to form and store the form raster by the height of 256 dots.

It is sufficient to draw the drawing object into the form raster in substantially the same manner as the procedure for drawing the drawing object of the normal page into the raster memory upon shipping. That is, as described in the conventional technique, each mask object such as a font pattern or the like is drawn for all of the planes (it is drawn to the planes in which the bit of the background designation in the drawing information has been set to "1" and in order to erase in white, it is drawn to the planes in which the bit has been set to "0").

When it is decided in step S705 that the print data is not the form raster registration command, in step S710, an analysis of the other print command such as a setting of a print environment or the like is executed. The processing routine is returned to step S701.

Figures 8A, 8B, 8C:
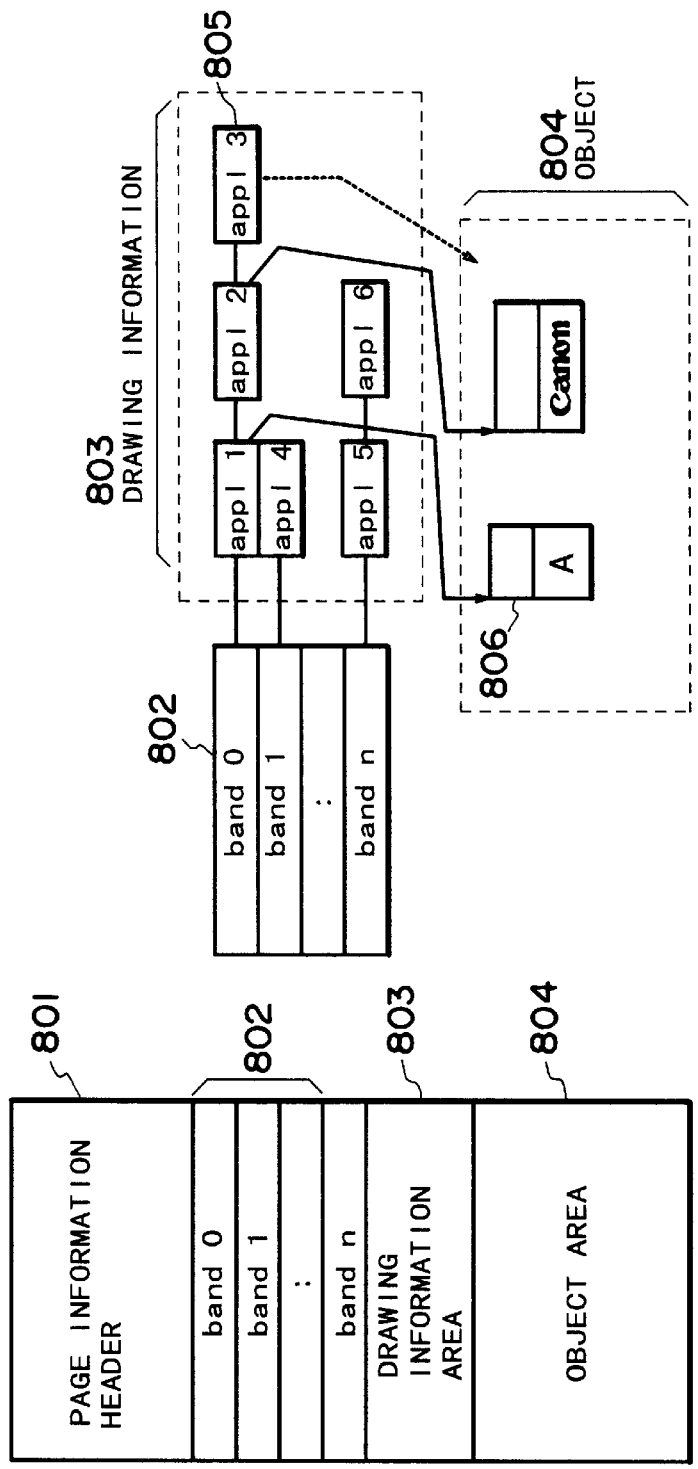
FIGS. 8A, 8B and 8C are diagrams for explaining a construction of an object memory and an application of the image processing apparatus shown in the first embodiment.

FIGS. 8A to 8C are a memory map (FIG. 8A) showing the object memory 605a of one page and block diagrams (FIGS. 8B and 8C) showing schematic constructions of management contents. In FIG. 8A, reference numeral 801 denotes a page information header to store various information of each page. The header 801 is constructed by information to be managed every page, namely: a page number which is sequentially counted from the turn-on of the power source; a print resolution; a sheet size; a color mode; the number of band rasters; a total capacity (memory use amount) of the drawing object belonging to the relevant page; information showing a state of the page such as "already drawn", "during the shipping", or the like; and the like. Reference numeral 802 denotes band tables. The band tables 802 as many as only the number of band rasters are prepared and a drawing information area 803 corresponding to each drawing object to be printed in each band is linked (FIG. 8B). It is now assumed that the drawing information is called an application (appl: abbreviation). Each application 805 and a drawing object 806 are generated and held into the drawing information area 803 and an object area 804, respectively.

FIG. 8C is a schematic diagram showing a construction of one drawing information (application). One drawing information is constructed so as to include the following information as information to draw the drawing object. That is, there are included: a printing position (bit offset value from the upper left edge) in the band; a drawing height of the drawing object; a drawing logic with the band raster; background information (BG information); a head address of the corresponding drawing object; an offset amount (the number of lines) to skip the reading of the drawing object in the case where the drawing object is drawn from the midway of the band; a head address of the next application (the end of link is set to NULL); and the like. It is now assumed that the BG information is constructed from a mode flag 807 and a plane flag 808 in the diagram.

In the case where the drawing object is drawn over a plurality of bands, the drawing object has a plurality of applications. That is, the applications as many as only the number of drawing times are allocated.

Figure 4:
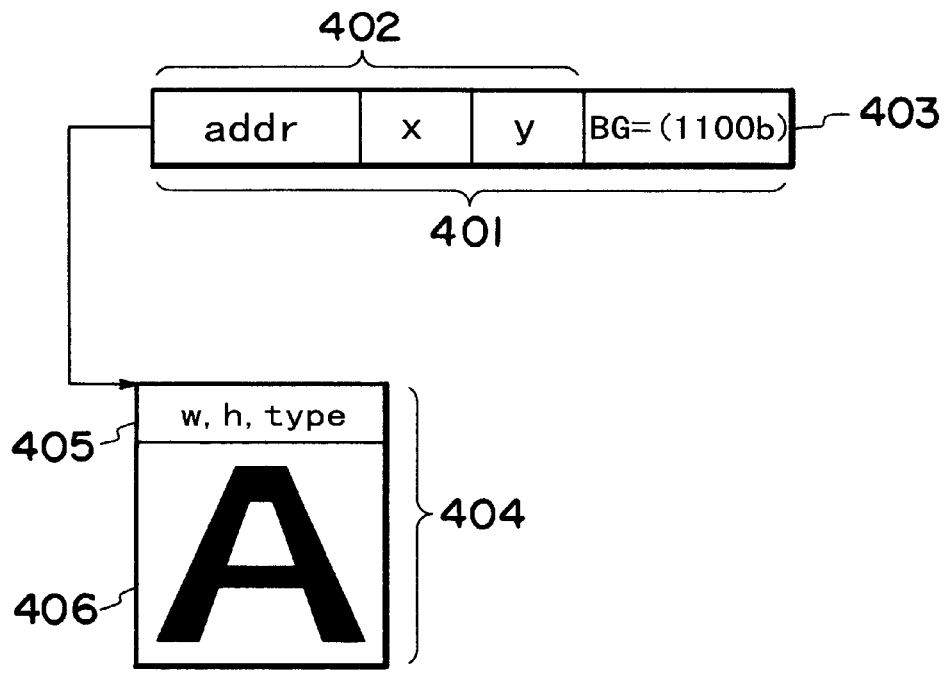
FIG. 4 is a schematic diagram showing a construction of a drawing object and an application in the conventional color image processing apparatus.
Figure 5:
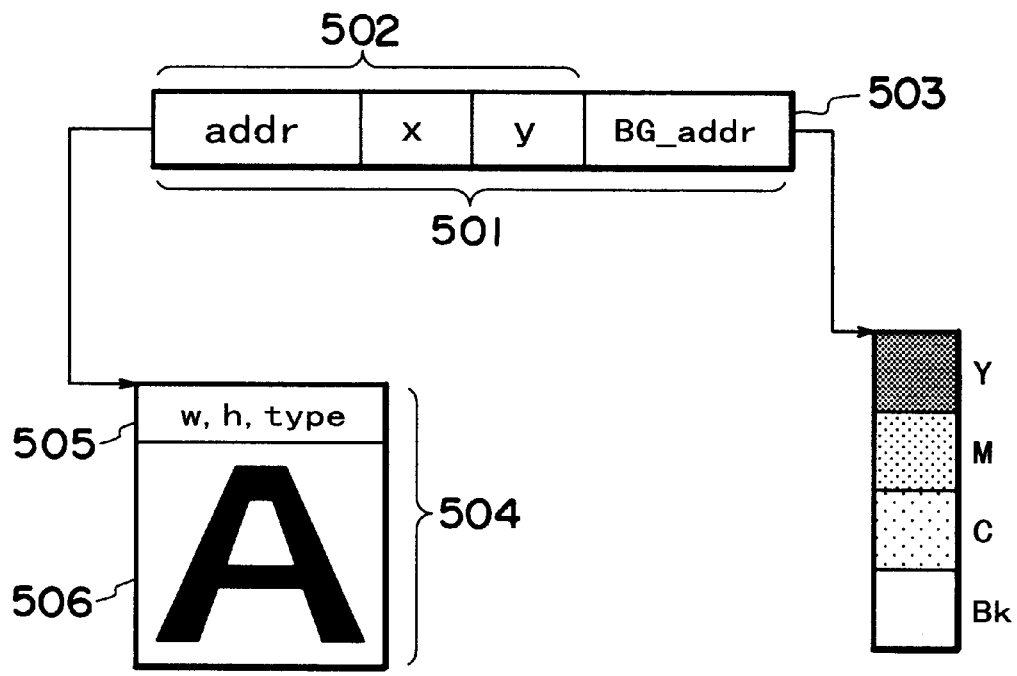
FIG. 5 is a schematic diagram showing a construction of a drawing object and an application in the conventional color image processing apparatus (in the case where a dither pattern is designated in a background)

As described in the conventional technique (FIG. 4), the plane flag 808 corresponds to the color information 403 and to which one of the YMCBk planes the drawing object is drawn is instructed by the contents of each bit. For example, as for red that is handled as binary data, the bit information of the plane flag is stored by setting (YMCBk) to (1100).

The mode flag 807 is a flag to instruct whether the bit which was set to "0" of the plane flag is validated or not.

When the mode flag is set to "1" the drawing process similar to that of the conventional technique is executed. That is, a mask object, namely, white is drawn for all of the planes including the planes in which the plane flag is equal to 0. Therefore, at the time of registration of the form raster, in the case where the drawing object belonging to the form is drawn onto the band raster and the case where the data to be overlaid is drawn, "1" is set into the mode flag of the BG information. This is because this process is a process which needs the color separation. As will be explained hereinlater, when the form raster is again drawn into the band raster, the mode flag 807 is set to "0".

As for each information in the application mentioned above, it is sufficient to have the number of bits which can express at least the designated print sheet by the designated resolution.

Figure 7:
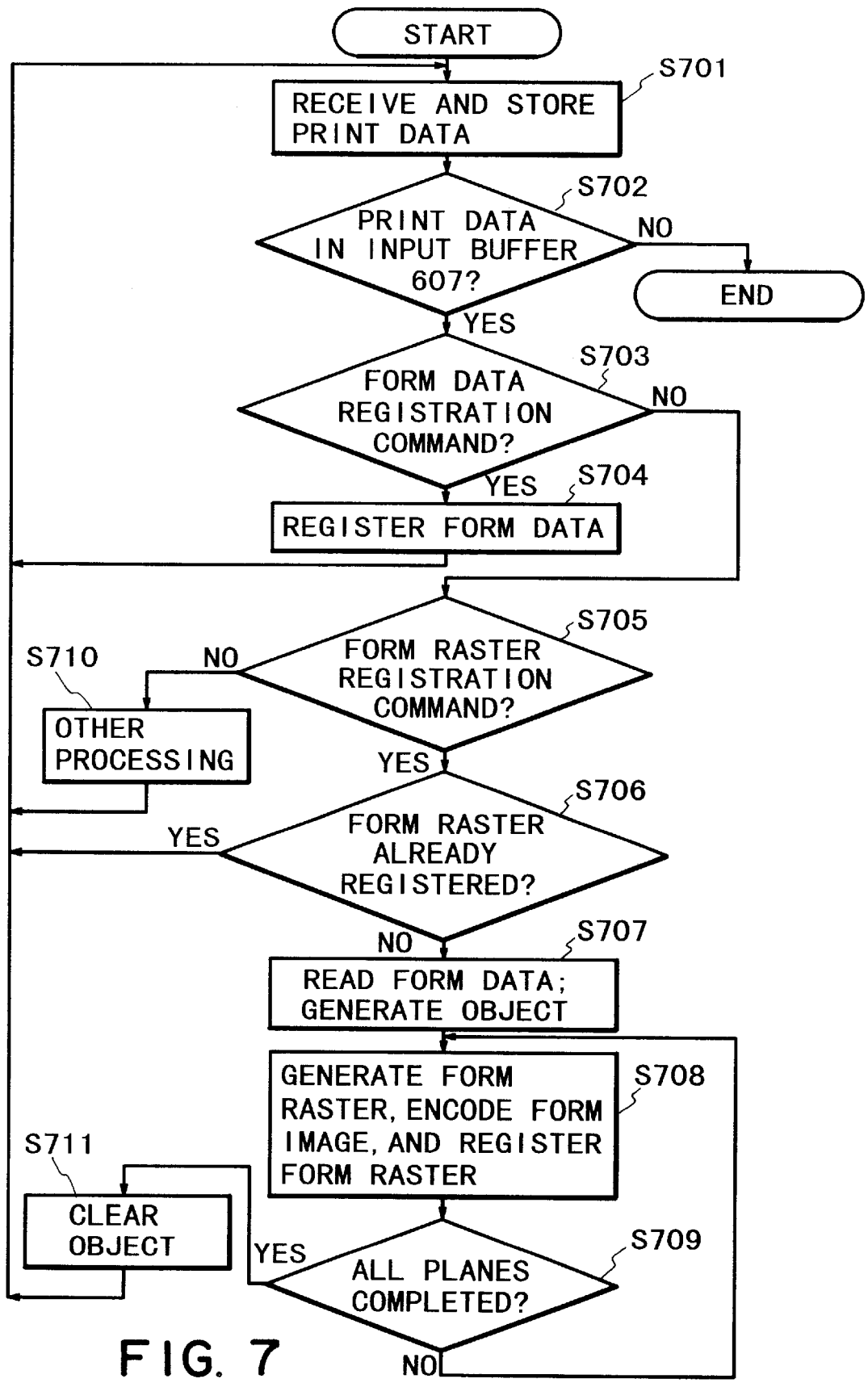
FIG. 7 is a flowchart showing a form raster registration processing procedure in the image processing apparatus shown in the first embodiment.

In step S708 in FIG. 7, in the process for drawing the drawing object in the form every band and forming the form raster, the linked applications are sequentially read out from the band table in accordance with a list (not shown) in which the drawing order is disclosed and the drawing object is drawn in accordance with the printing position information or the like in each application. When the next application address is set to NULL, the drawing process of the band is finished. Even in case of drawing the data to be overlaid, it is sufficient to use substantially the same construction as that mentioned above and the drawing using the same object drawer 603c can be performed.

Figures 9, 9A:
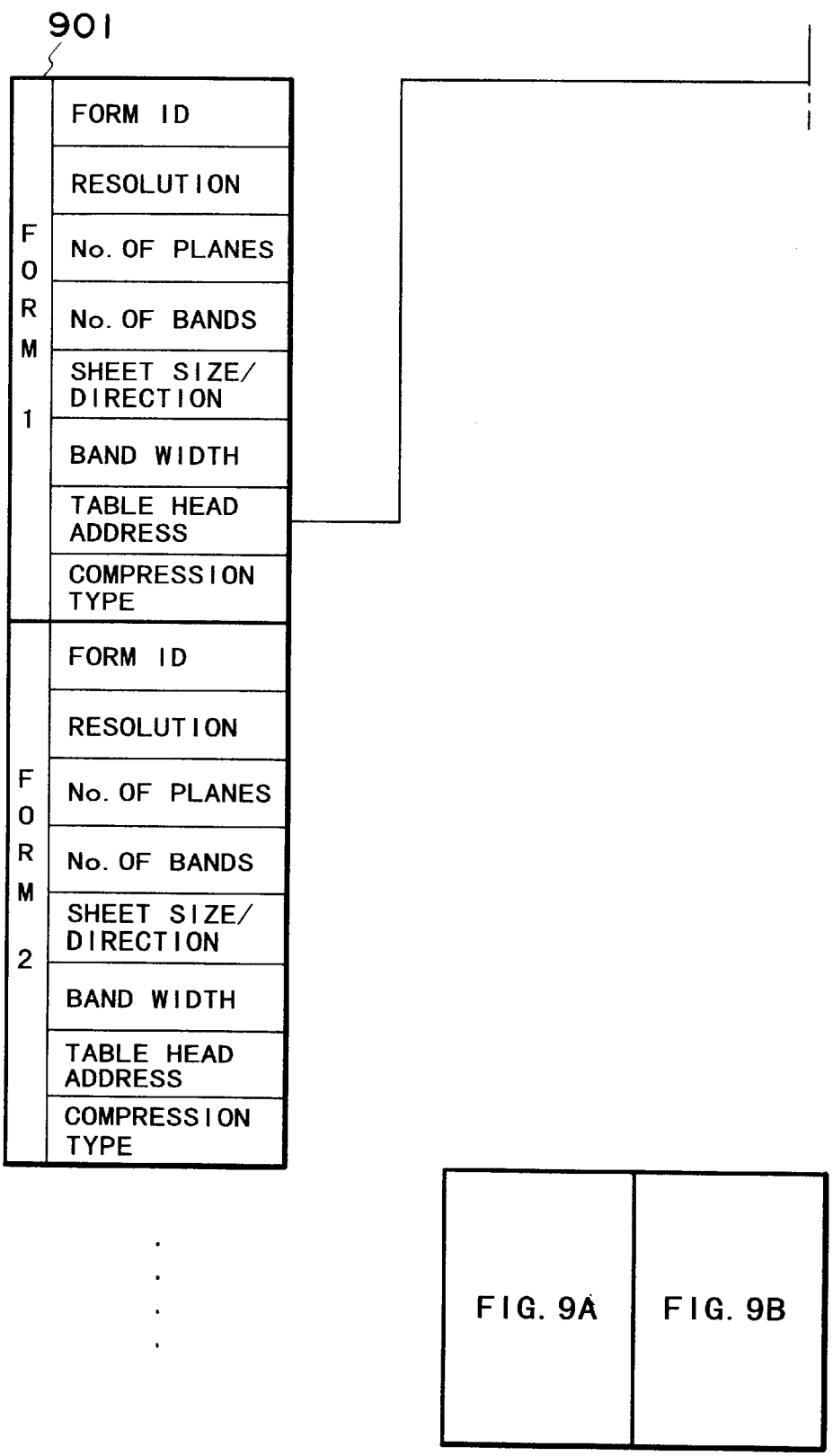
FIG. 9, which is composed of FIGS. 9A and 9B, is a block diagramss for explaining a construction of a form image memory in the image processing apparatus shown in the first embodiment.
Figure 9B:
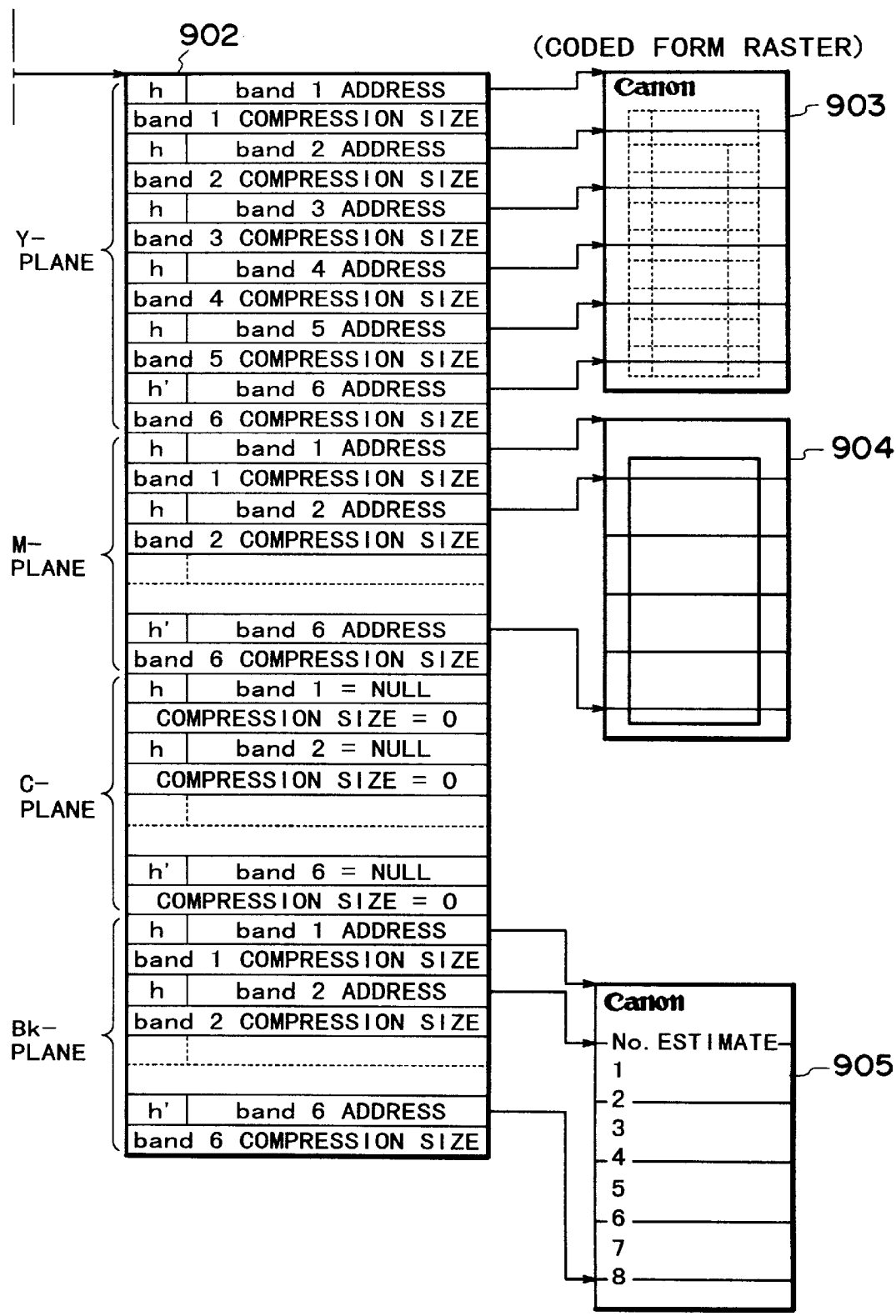

FIGS. 9A and 9B are diagrams showing a schematic memory construction of the form raster memory 605d which is managed by the form memory manager 603d. In the diagram, reference numeral 901 denotes a management table of each form. The management table 901 is constructed by information which is necessary to draw and identify each form. A memory area for the management table can be preliminarily assured in a fixed area in the form raster memory 605d or a memory area of a possible size can be also dynamically assured.

The management table includes therein: a form ID (which is managed by the same number as that of the host computer); a print resolution; the number of planes; the total number of divided bands; a sheet size (including the conveying direction); a band width; a head address in a form raster band table 902; a form raster compression type; the number of gradations (bits/pixels; not shown); and the like.

The resolution, sheet size (and conveying direction), and band width in the above information are set on the basis of the print data and panel set values at a time point when the form raster is formed. The form ID is instructed as a parameter of the form data registration command by a printer driver or the like on the host. By possessing such information, a plurality of form rasters in which the resolutions, sheet conveying directions, and the like differ can be prepared for one form data.

The form raster band table 902 is a table to store information of a band-shaped form raster unit divided in step S708 in FIG. 7. The form raster tables 902 as many as only the number of planes and the number of bands in the form management table 901 are assured and include a head address of each form raster, a height of each band, and a form raster compression size (bytes) of each band.

The diagram shows a case where the number of planes=4 (YMCBk) and the number of bands=6 and the form raster band tables 902 as many as only (4×6=24) bands are assured. In the present example, since the form contents to be drawn in the C plane do not exist, all of the form raster head addresses of the C plane are set to NULL and the compression size is set to "0", respectively. If the heights of all bands including the bottom band are constant, it is also possible to construct so as to hold the band height into the form management table 901.

Further, although the explanation has been made so as to manage the form raster compression size every band raster, it is also possible to construct so as to hold the sum of all planes into the form management table 901. Reference numerals 903, 904, and 905 denote coded form rasters of the Y plane, M plane, and Bk plane, respectively, and they are actually coded by a format according to the compression type.

Figure 10:
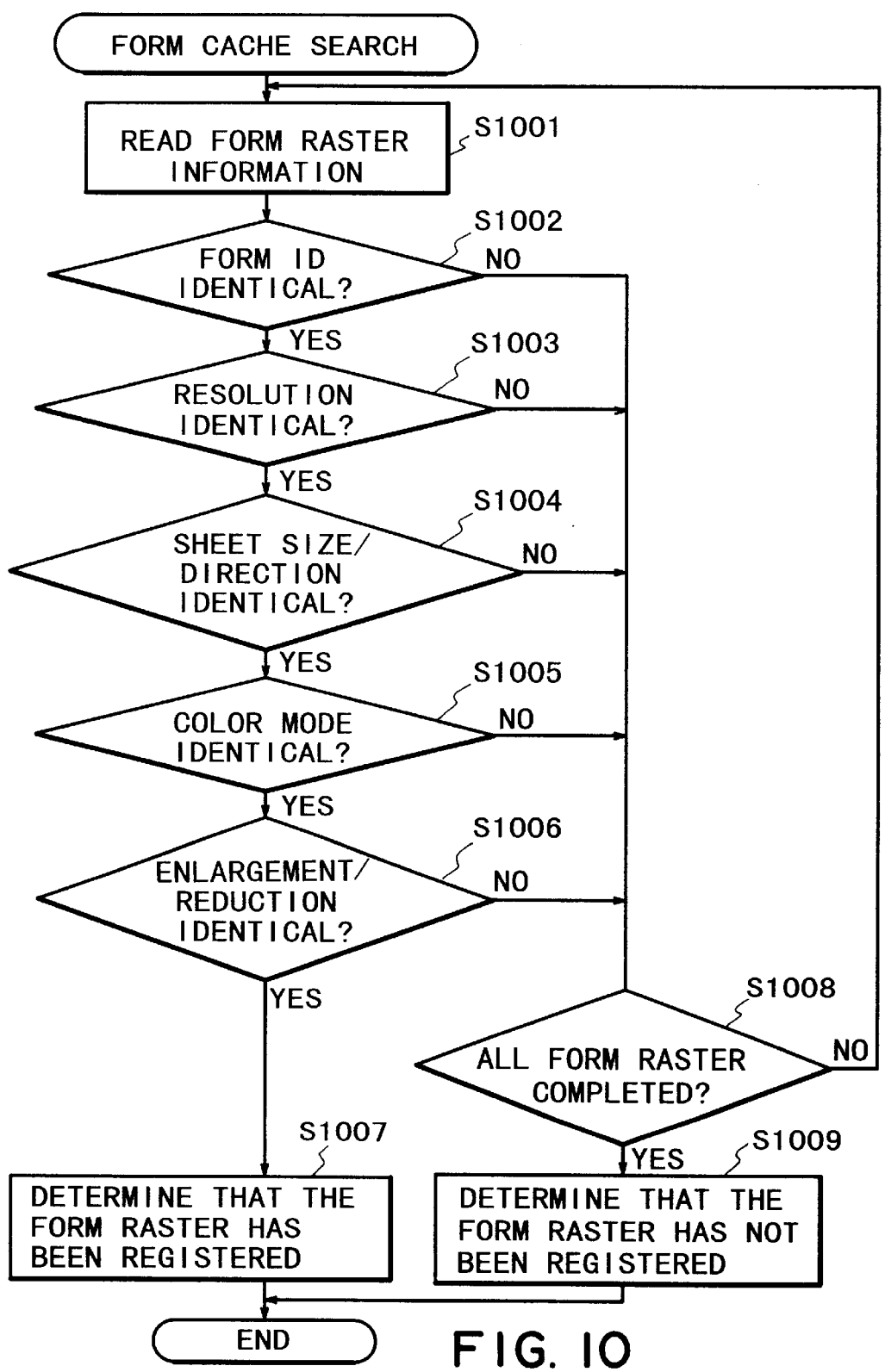
FIG. 10 is a flowchart showing a form image searching procedure in the image processing apparatus shown in the first embodiment.

FIG. 10 is a flowchart showing a searching procedure (step S706 in FIG. 7) for allowing the form memory manager 603d of the control program to discriminate whether the form raster corresponding to the requested form data has already been registered in the form raster memory 605d or not.

First, in step S1001 in the diagram, the first form raster information is read out from the form management table 901 in the form raster memory 605d and a check is made to see if it coincides with each of the print information upon generation of the form raster registration command (S1002 to S1006).

First, the form ID of the print information upon generation of the form raster registration command inputted from the outside is compared with the form ID in the form raster information (S1002). If they are identical, it is compared with the other form raster information (S1003 and subsequent steps). If they are not identical, to read the next form raster, step S1008 follows. In a manner similar to the above, whether each of the print resolution (S1003), the sheet size/direction (S1004), and the color mode (S1005) is identical or not is examined, and whether the page enlargement/reduction has been designated or not is discriminated (S1006), respectively. If all of the above conditions are identical, it is determined in step S1007 that the form raster corresponding to the designated form ID has already been registered (the valid form ID is notified as form raster presence/absence information).

The sheet size/sheet conveying direction are distinguished by a combination of the sheet size and the direction in a manner such that a case of the portrait feeding of the A4 size is set to "0" and a case of the transverse feeding of the A4 size is set to "1". In the embodiment, it is assumed that the form raster is always registered by a direct copy size and the above conditions are identical only when the enlargement/reduction is not designated. In the comparison of the color mode in step S1005, besides the distinction about the monochromatic/color printing, whether the number of gradations of the raster image is identical or not is also compared.

When any one of the information is not identical in steps S1002 to S1006, a check is made in step S1008 to see if the search of all of the registered form rasters has been finished. If NO, the processing routine is returned to step S1001. When the search of all of the form rasters is finished, it is decided in step S1009 that the form raster is not registered yet, for example, an invalid form ID such as "−1" is notified.

A format of the print data showing a print command to execute the form overlay from the host computer to the image processing apparatus will now be described with reference to FIG. 14. In case of the diagram shown, the print data is constructed by form data regarding various environment settings with respect to the form and the data to be overlaid (character data or the like which is composed onto the form) which are used to form-overlay at a processing resolution of 600 dpi. More specifically speaking, the print data is constructed by the following data.

The first and last data of the print data is constructed by a language called a JL (Job Language). The JL as a first definition is made up of the following data.

A job start command showing the start of a job of the print data

A processing resolution designation command to set a processing resolution to process the subsequent data to be overlaid and form data of the PDL data format A processing gradation designation command to designate the gradation to be processed.

A memory configuration in the RAM 605 is executed in accordance with the instructed resolution and gradation information and their areas are set. Processes of the subsequent form data and data to be overlaid of the PDL data format are also executed in accordance with the designation of the processing resolution and processing gradation.

A sheet conveying direction setting command to designate the sheet conveying direction (portrait feeding/transverse feeding)

A binding margin setting command and a binding position setting command to designate the image of the data to be overlaid and the mapping position on the print sheet in case of binding the print sheets A PDL shift command to instruct the activation of a PDL analysis processing program in order to process the print data comprising the subsequent form data and data to be overlaid The construction up to this stage corresponds to the JL. After this stage, the data is written by a PDL (page description language).

A PDL data start command showing the start of the print data

An enlargement/reduction instruction command which is set when the inputted data to be overlaid is enlarged/reduced and drawn A sheet size instruction command to instruct the size of print sheet on which the image of the data to be overlaid should be formed A form overlay execution command (including information to specify forms such as form name, form ID, and the like) to instruct the execution of the form overlay.

The form overlay execution command is used for allowing the form image which has previously been stored in the form raster memory 605d to be searched by the form cache searching process described in FIG. 10 and enabling the searched form image to be used, thereby allowing the drawing process of the form overlay data to be executed at a high speed. If the form image is not stored in the form raster memory 605d, in a manner similar to the data to be overlaid, reading and analyzing processes of the form data are executed and the form overlay is executed.

Data to be overlaid on which a form overlay image should be overlaid

A PDL data end command which denotes the end of the PDL data and a job end command to define the end of the print job The last job end command is a JL. The foregoing print data is print data which is sent to the printing apparatus with a structure such that form data is previously stored (registered) into a non-volatile storage medium. That is, before the print data is received, the printing apparatus has already received the data of the form raster registration command. It will be obviously understood that for the printing apparatus which cannot register the form data, form data (PDL) is necessary after the form overlay execution command of the print data mentioned above.

The image processing apparatus receives the print data constructed as described above from the host computer as an external apparatus and executes the form overlay process.

A processing procedure upon form overlay designation will now be described hereinbelow with reference to a flowchart of FIGS. 11A and 11B.

In the diagram, since the reception (step S1101) of the print data and the check (step S1102) about the presence or absence of the print data are similar to those in steps S701 and S702 in FIG. 7, their descriptions are omitted.

In next step S1103 and subsequent steps, the image processing apparatus analyzes the print data on the basis of a predetermined printing program stored in the ROM 602. First in step S1103, a check is made to see if the print data which is being processed is a sheet ejection command. If NO, in next step S1104 and subsequent steps, the analysis is continued by regarding such that the print data is the data to be printed in the page which is at present being processed. If the print data is decided to be the sheet ejection command, in step S1112 and subsequent steps, the drawing and sheet ejecting processes are executed on the assumption that the page has been completed. In step S1103, the explanation has been made with respect to the case of discriminating the sheet ejection command (for example, a form feed command) for simplicity of explanation. However, actually, even in case of the print data which can become a factor of causing the sheet ejecting operation such as a case where the printing position exceeds the bottom edge of the page due to a character printing position moving command or the like, the processing routine advances to step S1112 and subsequent steps in a manner similar to the sheet ejection command.

In step S1104, a check is made to see if the inputted print data is a form designation command. If YES, on the basis of the form ID designated by the parameter of the form designation command, whether the form raster has been registered in the form raster memory 605d or not is searched (step S1105; refer to the flowchart of FIG. 10 for details). As a result of the search, if it is determined that the form raster adapted to the designated form ID and the current printing conditions has already been registered (hereinafter, described as a case where it has been hit), an application (drawing information) corresponding to each of the form rasters which were divided into the bands and compressed and held is generated in the object memory 605a (step S1106). "0" is set into the mode flag which is set into the application, thereby instructing so as to independently perform the drawing process every plane. That is, as an application corresponding to the form raster, up to four applications for the Y plane, M plane, C plane, and Bk plane are linked in one band (which will be explained hereinlater in FIG. 12). When the mode flag is equal to "1" as mentioned above, a process for erasing (drawing in white) the data at the position corresponding to the drawing object is executed to the plane in which the drawing is unnecessary like a conventional color printer. On the other hand, by setting the mode flag to "0", a drawing process different from the conventional one is executed. Although the drawing process will be described hereinlater, when simply explaining, this is because it is necessary to redraw the image data which was once color-separated and, according to the same drawing process as the conventional process, the image data of the plane in which the drawing is necessary is also drawn in white, and it is necessary to prevent the data from being erased.

The process in step S1106 is repeated until the processes for all of the bands (S1107) and all of the planes (S1108) are finished. When the making of the applications (drawing information) for all of the form rasters is completed, to process the subsequent print data, the processing routine is returned to step S1101.

When it is decided in step S1105 that the form raster corresponding to the designated form ID is not registered yet (not hit), the form data of the page description language format is read out from the form data memory 605b and the relevant form data is analyzed (S1110). Each drawing object/application is generated (the mode flag is set to "1") in a manner similar to the case of registering the form raster. After completion of the processes of one form, the processing routine is returned to step S1101 in order to process the subsequent print data.

When the print data is not the form designation command in step S1104, the print data is processed as print data (data to be overlaid) to be drawn to the normal page in step S1109. That is, when the print data is a character print command, scalable data corresponding to the font information (font, size, character code, etc.) designated by the print data is read out from the font ROM 604 and the corresponding dot pattern (=drawing object) is generated. The dot pattern is stored into the object memory 605a together with the application (drawing information) according to the printing position information, width, height, drawing logic, and the like. Even when the print data is figure data or image data other than characters, an intermediate code/application corresponding to each print command is similarly generated.

When the print data is the sheet ejection command or a command corresponding to the sheet ejection command in step S1103, each drawing object of the form raster or data to be overlaid is drawn into the band buffer with reference to each of the application information formed in the object memory 605a (steps S1112 to S1117).

First, the mode flag in each application is checked (step S1112). When the mode flag is equal to "0", the coded form raster of one band is read out from the form raster memory 605d by the form raster drawer 603e and is decoded and, after that, it is drawn into the band buffer 605c (step S1113). Since the shipping operation to the printer engine is area sequentially performed with respect to YMCBk, however, among the plane flags in the application, in the case where the bit at the position corresponding to the plane which is being processed is not set to "1", the reading of this application is skipped. That is, in this mode, the data is shipped to only the planes in which the drawing is actually necessary. The data of the planes in which the drawing is unnecessary is not processed. In the embodiment, the drawing order is set such that, as mentioned in the description of the print data in FIG. 14, before the data to be overlaid of the PDL is drawn, the drawing of the form raster (cached form) is executed to the band buffer of each plane. Therefore, since the form raster is drawn (actually, redrawn) in a state where no data exists in the band buffer, it is sufficient to merely independently draw only the planes in which the plane flag is equal to "1".

On the other hand, if the mode flag is not equal to "0" (namely, the mode flag is equal to "1"), the drawing object of the normal page is read out from the object memory 605a and is sequentially drawn into the band buffer (step S1114). In this case, the object is certainly drawn irrespective of the contents of the plane flag. That is, the object is drawn to the plane in which the drawing is necessary. For the plane in which the drawing is unnecessary, the data is erased by drawing in white at the position of the object.

The above processes are repeated simultaneously with the shipping operation to the engine until the application of one band is finished (S1115). Until the completion of the drawing of all bands of one plane, the processes in steps S1112 to S1115 are repeated with respect to all of the bands (S1116). When the processes of all bands are finished, the processes in steps S1112 to S1116 are further repeated until the end of the drawing of all planes (S1117). Finally, to process the print data of the subsequent page, the processing routine is returned to step S1101.

As mentioned above, when the form data or print data is drawn, the drawing object is generated from each data and the image data is formed in the band buffers of all of the planes (also including the blank space). The form raster which has already been cached to the form raster memory 605d is again drawn (data is copied) into only the band buffers of the planes in which the drawing is necessary.

Figure 12:
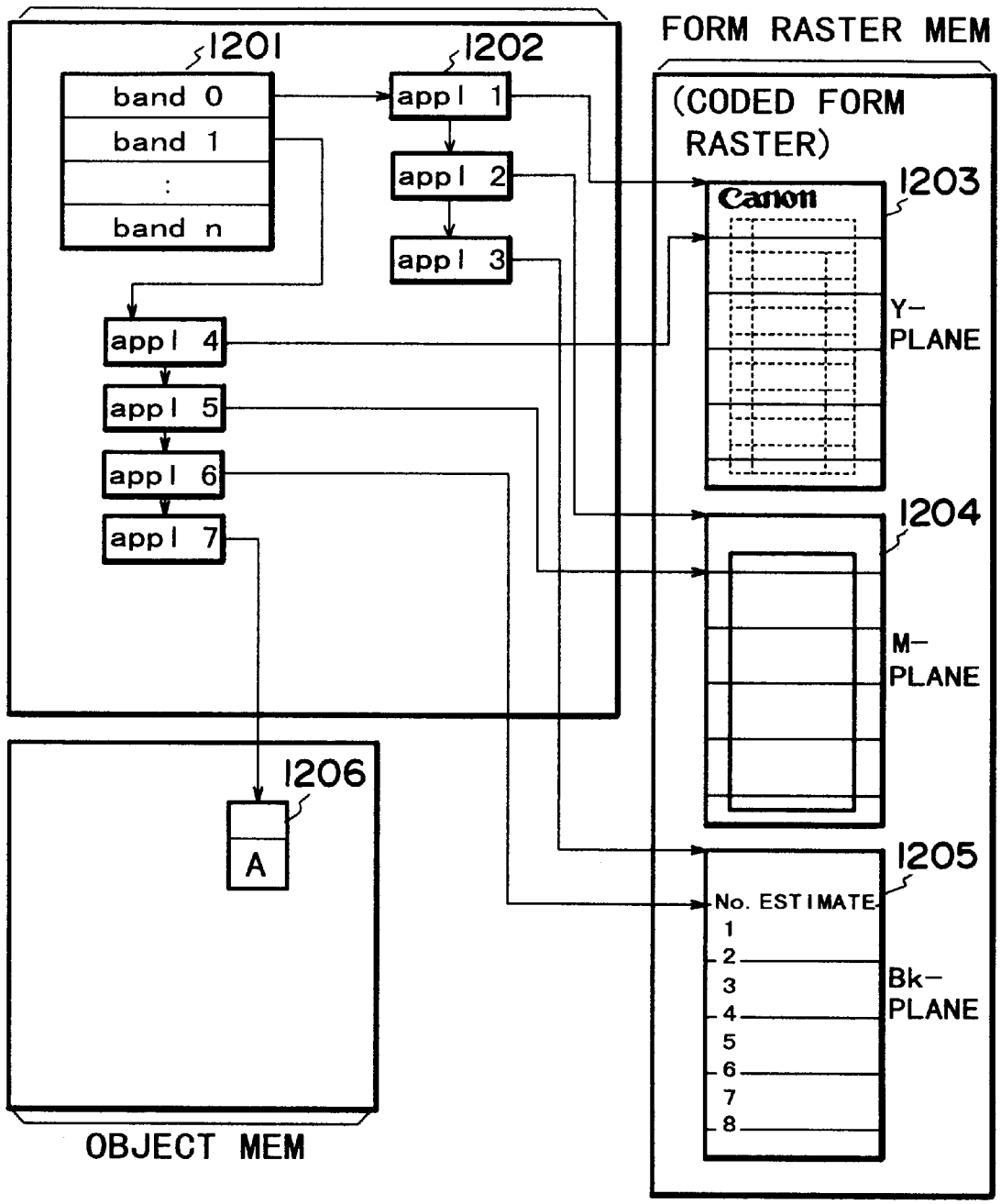
FIG. 12 is a diagram for explaining a link relation between an application and a form raster in the image processing apparatus shown in the first embodiment.

A construction of the application (drawing information) when the form raster is drawn will now be described hereinbelow with reference to FIG. 12.

In the diagram, a band table 1201 and each application 1202 correspond to 802 and 805 in FIG. 8 and a drawing object (character pattern "A" here) 1206 corresponds to 806 in FIG. 8. Applications appl 1 to appl 3 are linked to the first band (band 0) and applications appl 4 to appl 7 are linked to the second band (band 1), respectively. Each drawing object to be printed in each band is linked from the application (drawing information). That is, the coded raster of the first band in a form raster 1203 is linked to the application appl 1. The bit in which the mode flag of appl 1 is equal to "0" and the plane flag corresponds to Y is set to "1". In a manner similar to the above, the coded raster (the bit in which the mode flag is equal to "0" and the plane flag corresponds to M is set to "1") of the first band in a form raster 1204 is linked to appl 2 and the coded raster (the bit in which the mode flag is equal to "0" and the plane flag corresponds to Bk is set to "1") of the first band in a form raster 1205 is linked to appl 3.

Further, the coded rasters (the bits in which the mode flags are equal to "0" and the plane flags sequentially correspond to Y, M, and Bk are set to "1") of the second bands in the form rasters, 1203, 1204, and 1205 are linked to appl 4, appl 5, and appl 6 linked to the second band (band 1) in the page, respectively. Although an explanation is omitted in the diagram, the form rasters are linked from the applications up to band 5 in a manner similar to the above. The present construction is formed in step S1106 of the flowchart of FIGS. 11A and 11B.

On the other hand, subsequently to appl 6, appl 7 is linked to band 1 and this shows that the drawing object 1206 is drawn. The mode flag of appl 7 is set to "1" and the same object is drawn to all of the planes. As described above, when the application corresponding to the form raster is linked to the head of the application list and is drawn into the band buffer, by reading out the application list from the link head and by drawing each object, the form raster is certainly drawn at the bottom in the page.

Processes in case of performing the overlay printing without using the form raster registration command will now be described in detail with reference to a flowchart of FIGS. 15A, 15B and 15C.

Figure 11B:
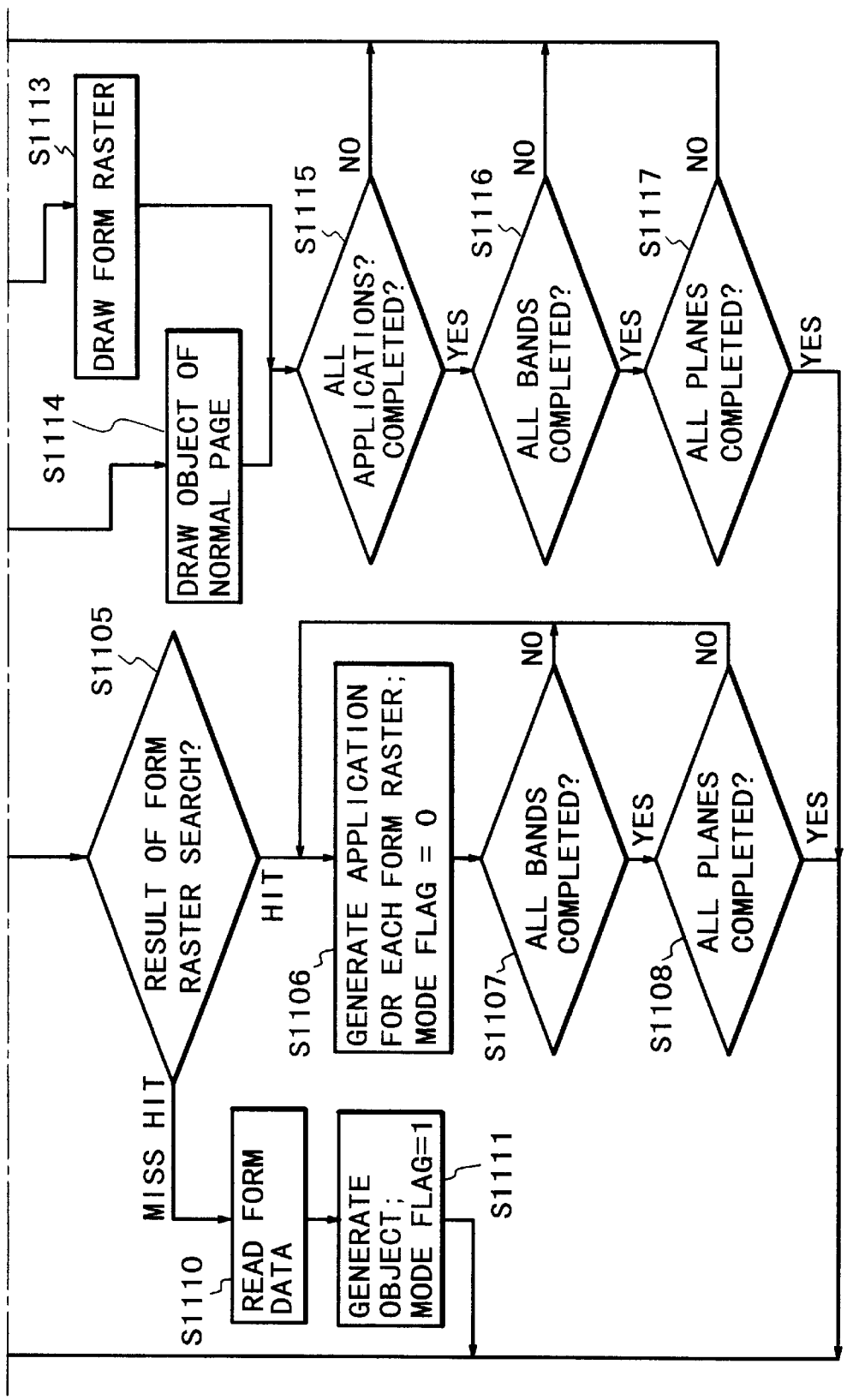
FIG. 11, which is composed of FIGS. 11A and 11B, is a flowchart showing a processing procedure for a form overlay designation command in the image processing apparatus shown in the first embodiment.

The processes which will be explained hereinbelow also correspond to the processes (steps S1110 to S1111 in FIGS. 11A and 11B) in the case where the analyzing/drawing process of the data to be overlaid in step S1109 in FIGS. 11A and 11B is executed or the processes in the case where the desired form raster is not found in step S1105. Although the form data is read out in a lump in steps S1110 and S1111 and the corresponding drawing object is generated in FIGS. 11A and 11B, to show more in detail in FIGS. 15A, 15B and 15C, a case of switching a reading source of the print data will be described.

Figure 15A:
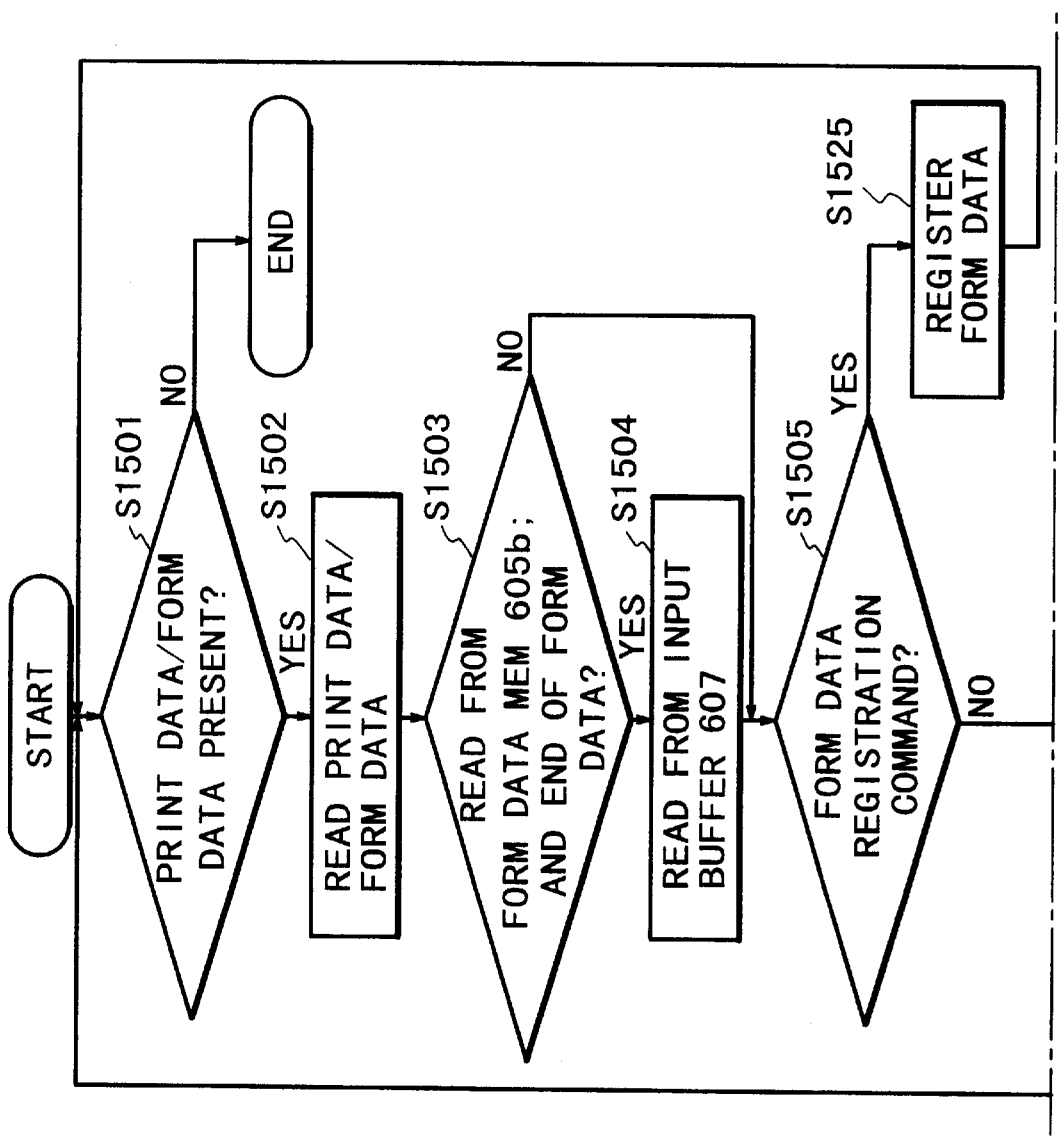
FIG. 15, which is composed of FIGS. 15A, 15B and 15C, is a flowchart showing a procedure in case of performing a form overlay without using a form raster registration command (flowchart showing a procedure also corresponding to a process=S1109 except for the form designation command and processes=S1110 to S1111 in the case where the designated form raster cannot be found in FIGS. 11A and 11B).
Figure 15B:
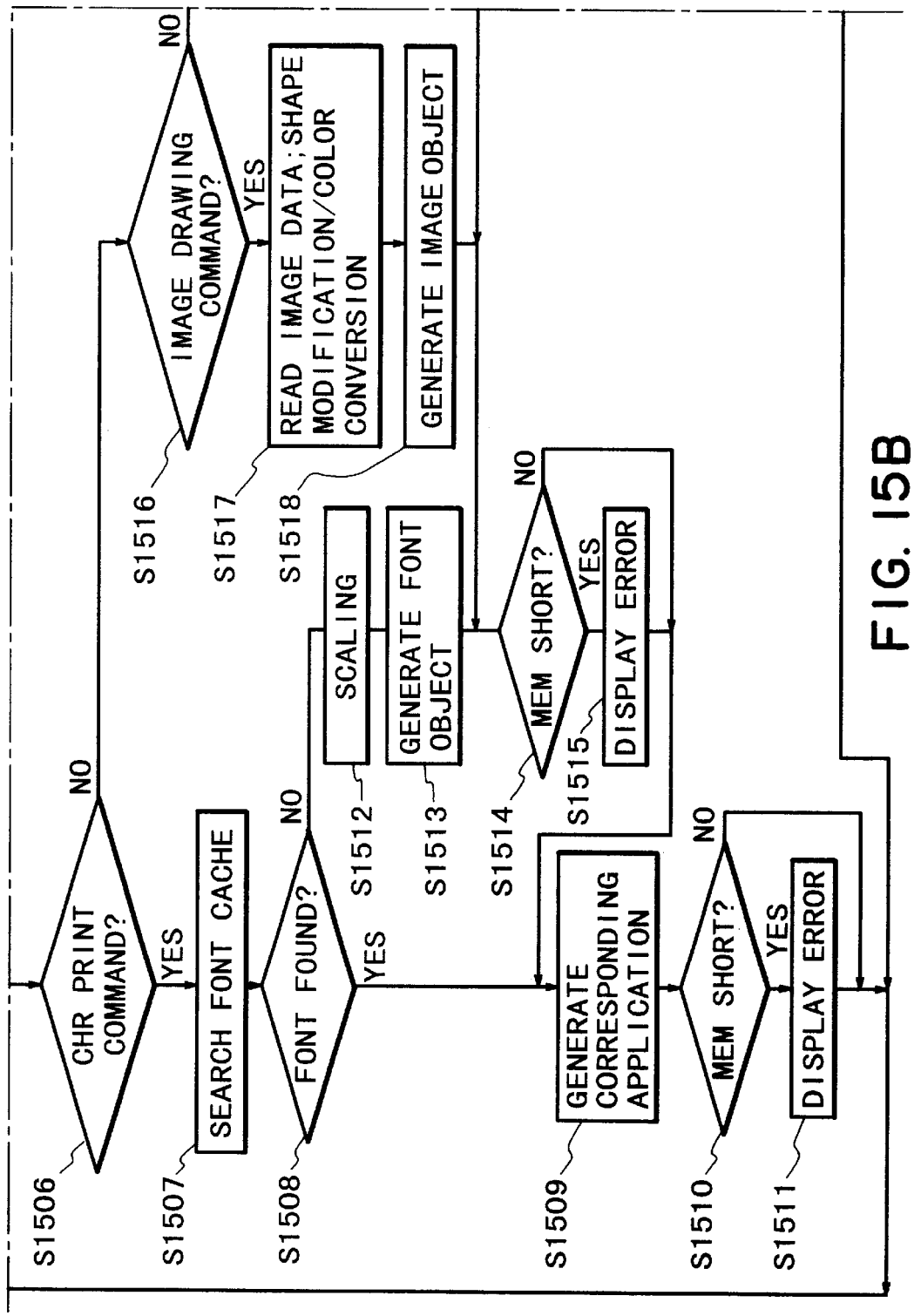

In FIGS. 15A, 15B and 15C, first in step S1501, the CPU 601 discriminates the presence or absence of print data. If the print data does not exist, the processing routine is finished. The data reading source is the input buffer if the form designation command is not being processed. The data reading source is the registered form data memory 605b when the form designation command is being processed (the switching of the reading source will be described in steps S1504 and S1523).

When it is decided in step S1501 that the print data or form data exists, the print data or form data is read out in next step S1502. When the data reading source is the form data memory 605b and the data is the end of the form data (step S1503), the data reading source is switched to the input buffer (S1504). If the data is not the end of the form data, the data reading source is not switched but the next data is subsequently read out.

In step S1505 and subsequent steps, the read-out data is analyzed. In step S1505, a check is made to see if the read-out data is the print data from the input buffer and the print data is the form data registration command. When the read-out data is determined to be the form data registration command, in step S1525, the form data as much as the size instructed as a parameter of the form data registration command is read out from the input buffer and written into the form data memory 605b. To read out the next print data from the input buffer 607, the processing routine is returned to step S1501.

When it is decided in step S1505 that the read-out data is not the form data registration command, a check is made in next step S1506 to see if the read-out data is a character print command. If the read-out data is decided to be the character print command, the cached font is searched from a font cache area (not shown) in the RAM 605 in step S1507. In step S1508, as a result of the search, a check is made to see if the font has been cached. If YES, corresponding drawing instruction information (application) is generated in step S1509. In FIGS. 15A, 15B and 15C, since the print data in the form data and the data to be overlaid are processed in substantially the same manner, all of the mode flags described in FIGS. 11A and 11B are set to "1".

Although an explanation is omitted in FIGS. 11A and 11B and the like, the following processes are subsequently executed. That is, a check is made in step S1510 to see if a shortage of the memory has occurred at the time of making of the application. If the shortage of the memory is decided, in step S1511, an error is displayed on a display panel or the like of the main body of the controller 103. To process the next data, the processing routine is returned to step S1501.

When the character pattern to be printed is not found in the font cache in step S1508, in step S1512, as for the font scaler (a part of the object generator 603a), outline data corresponding to the font and character code designated by the parameters of the print data is read out from the font ROM 604 and a character pattern corresponding to the character size and direction likewise designated by the parameters is formed.

In step S1513, a font object is generated (also registered into the font cache). In step S1514, a check is made to see if a shortage of the memory has occurred. If YES, in step S1515, an error is displayed on the display panel or the like of the main body of the controller 103. Since the processes in step S1515 and subsequent steps are similar to those in case of hitting into the font cache, their descriptions are omitted here.

When the print data is not the character print command in step S1506, a check is sequentially made to see if it is an image drawing command (S1516), a line drawing command (S1519), or a form designation command (S1521). If YES in steps S1517 to S1518 and step S1520, the drawing object according to each of the print commands is generated (all of the applications are formed by the mode flag "1"). It is not always necessary to perform the discrimination of those print commands in accordance with the above order and it is assumed that, the other many print commands and drawing objects (not shown in FIGS. 15A, 15B and 15C) can be also processed (S1524).

When the print command is decided to be the form designation command in step S1521, a check is made in step S1522 to see if the form data designated by the parameter of the form designation command has already been registered in the form data memory 605b. If NO, the present form designation command is invalidated and the processing routine is returned to step S1501. However, if the form data has already been registered, the data reading source is switched to the form data in step S1523. Specifically speaking, it is sufficient to construct in a manner such that a flag showing which one of the input buffer and the form data the reading source is and an RAM address serving as a reading source are provided and those flag and RAM address are properly set. (The RAM address indicates either the input buffer 607 or the form data memory 605b.) After that, to process the other print data, the processing routine is returned to step S1501.

As mentioned above, after the form designation command was recognized, the reading source of the print data is switched to the form data memory. The component elements of the form such as characters, images, or lines stored as form data are processed in substantially the same manner as the case where the printing is instructed in the data to be overlaid (normal page).

In the above description, the form data is read out and the corresponding drawing object is generated only in the case where the form designation command is recognized. However, it is also possible to construct so as to automatically read out the form data every page until the form designation is cancelled.

As for the drawing objects generated in accordance with the flowchart of FIGS. 15A, 15B and 15C, both of the drawing object processed as a part of the form data and the drawing object processed as data to be overlaid are mixedly stored into the object memory 605a.

Therefore, the application (mode flag=1) in the form data and the application (mode flag=1) of the data to be overlaid are linked from the same band table 802 to the application 805 described in FIG. 8 and, at the time of the sheet ejection, all of them are drawn into the band buffer 605c by the mode flag=1 (step S1114 in FIGS. 11A and 11B). That is, in accordance with the plane flag 808 of the application, while the drawing is performed by "1" for the planes in which the plane flag is set to "1" (painted in black), the drawing is performed by "0" for the planes in which the plane flag is set to "0" (blank space).

The construction according to the first aspect of the invention comprises: memory means (RAM 605) having plane buffers (for example, the band buffer 605c) to store a plurality of plane images; first drawing means (which is controlled by the CPU 601 on the basis of the program stored in the form raster drawer 603e) for independently drawing image data into each plane buffer on the basis of a print command; and second drawing means (which is controlled by the CPU 601 on the basis of the program stored in the object drawer 603*c*) for drawing the image data into the plane buffers in which the drawing is necessary and erasing data at the positions of the image data in the planes in which the drawing is unnecessary on the basis of a print command, wherein the first drawing means and the second drawing means are switched and the image data is drawn (this switching is controlled by the CPU 601 on the basis of the mode flag).

The construction according to the further aspect further comprises: form image memory means (form raster memory 605*d* in the RAM 605) for storing the form image (form raster in the embodiment) on the basis of the input form data; and control means (function of the CPU 601) for controlling in a manner such that the form image is drawn in the plane buffer by the first drawing means and the print data which is written to a predetermined position of the form is drawn in the plane buffer by the second drawing means.

According to the construction of the second aspect of the invention, there is provided the image processing apparatus which can overlay-output form data of one page and print data (data to be overlaid in the embodiment) which is written to a predetermined position of a form, comprising: form data memory means (form data memory 605*b*) for storing the form data of at least one page; form image forming means (which is controlled by the CPU 601 on the basis of the program stored in the object drawer 603*c*) for reading out the form data from the form data memory means and analyzing the form data and forming a form image of one page every plane; form image holding means (form raster memory 605*d*) for holding the form image of at least one page; and form drawing means (which is controlled by the CPU 601 on the basis of the program stored in the form raster drawer 603*e*) for drawing the form image held in the form image holding means into a memory of the corresponding plane, wherein image data is drawn into the memory together with the form image on the basis of the print data (the CPU 601 switches the object drawer 603*c* and form raster drawer 603*e* and controls).

The construction according to the further aspect further has discriminating means (which is controlled by the CPU 601 in accordance with the flowchart of FIG. 10) for discriminating whether the form image corresponding to the form print command has been held in the form image holding means in the case where the form print command is instructed. When it is determined by the discriminating means that the corresponding form image has been held, the form image per plane is drawn onto the memory of the corresponding plane by the form image drawing means. When it is decided by the discriminating means that the corresponding form image is not held, the form data is read out from the form data memory means and analyzed by the form image forming means and the form image is drawn onto the memory of each corresponding plane.

According to the construction of the further aspect, the form image drawing means (form raster drawer 603*e*) independently draws the form image into each plane of the memory. The form image forming means (object drawer 603*c*) draws the image data into the plane in which the drawing is necessary in the memory on the basis of the intermediate data. The data at the position of the form image in the plane in which the drawing is unnecessary is erased.

The construction according to the further aspect further comprises: coding means (raster compressor 603*f*) for encoding a plurality of form images per color plane every plane; and decoding means (raster decompressor 603*f*) for decoding the coded form image every color plane.

With the above construction, according to the invention, the color form overlay can be outputted at a high speed irrespective of the contents of the form data. Particularly, in case of a print command of a plurality of pages such that the normal page differs every page for the form data of the same contents, the form data processing time of the second and subsequent pages can be set to almost 0.

With respect to the regular form portion, since there is no need to individually have the same drawing object every plural pages, the memory capacity that is required for the drawing objects as many as a plurality of pages can be totally suppressed. The reduction of the processing speed such as a sheet ejection waiting or the like can be avoided.

According to the invention, after the form image was formed, coded, held, and sequentially decoded every color plane on a unit basis obtained by dividing one page into bands, it is read out and drawn into the band buffer. Therefore, the pre-process and the skip reading process are unnecessary upon decoding. The invention can be easily applied to the image processing apparatus for drawing the normal page data by the banding method.

[Second Embodiment]

According to the second embodiment, a control of an image processing apparatus in case of using a writable non-volatile memory such as flash ROM, hard disk, or the like will be explained. As a non-volatile memory, for instance, there is an NVRAM. The NVRAM is, for example, an RAM to which a backup power source is always supplied by a battery or the like (not shown). The NVRAM stores and holds the contents set by the operator through the panel 104 or a command for environment setting from the host computer 101 and even if the power source is turned off, its stored contents are not lost. In case of turning on the power source, therefore, by initializing in accordance with the information stored in the NVRAM, the apparatus can be set to the state at the time of turn-on of the power source. In the embodiment, form data of the page description language format has been stored in the non-volatile memory. The second embodiment of the invention will now be described hereinbelow on the assumption that a flash ROM is used as a non-volatile memory.

Figure 13:
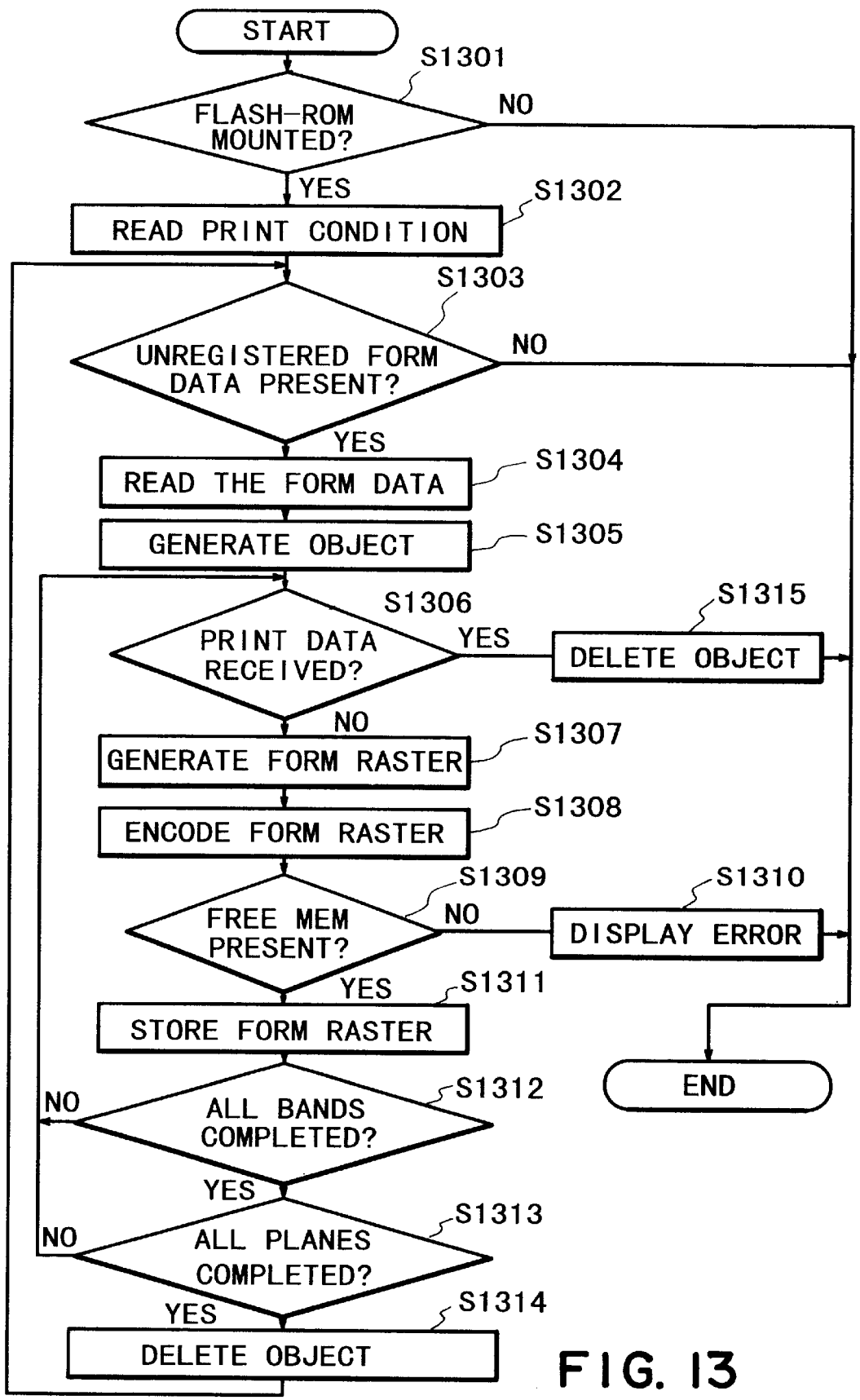
FIG. 13 is a flowchart showing a form raster registering procedure of an image processing apparatus having a non-volatile memory shown in the second embodiment.

FIG. 13 is a flowchart showing a form image forming procedure in the case where the form data of the page description language format has already been stored in the flash ROM. Processes in the present flowchart can be executed before the print data is received just after the power source of the image processing apparatus was turned on or for the free time when the print data to be processed is not received or the like. The processes can be also executed in accordance with commands received from the host computer.

In the diagram, first in step S1301, whether the flash ROM has been mounted or not is discriminated. If it is not mounted yet, the processes are finished. When the flash ROM has been mounted, in step S1302, printing conditions (print resolution, sheet conveying direction, color mode, etc.) which are necessary to form a form raster and have been set from a panel menu or the like are read out. In step S1303 and subsequent steps, the form raster is formed from the form data stored in the flash ROM and is registered into the form raster memory. That is, a check is first made to see if the unprocessed form data has been stored in the flash ROM (S1303). If the unprocessed form data is found, the form data is read out (S1304) and drawing objects of one page are generated (S1305).

Whether the print data has been received or not is discriminated in step S1306. When the print data exists in the input buffer, the generated drawing object corresponding to the form data is deleted (S1315) and the work memory or the like used as a work memory is also released. After that, the form image forming process is finished. While the form image is being stored, the form image stored in the halfway is also released.

In the embodiment, although the presence or absence of the reception data has been checked in only step S1306, the invention is not limited to such a construction. The print data can be confirmed before and after (a plurality of) steps which require a relatively long processing time or can be also periodically confirmed by a timer or the like. With this method, a print instruction inputted from the outside is not obstructed.

After the form image of one band was drawn into the band buffer by using the drawing object in step S1307, the form image is encoded in step S1308. In step S1309, a check is made to see if the form image memory has a memory capacity that is necessary for registration. If the free memory capacity is short, an error is displayed in step S1310. After that, the processes are finished.

If the form image can be registered, the coded form image is stored into the free area (S1311). The above processes in steps S1306 to S1311 are repeated until the processes for all bands (S1312) and all planes (S1313) are finished. In last step S1314, the unnecessary drawing object is deleted and the registering process of one form is finished. Although the embodiment has been described with respect to the case where an error is displayed at the time of a shortage of the memory and the processing routine is interrupted, it is also possible to construct in a manner such that the priority is set to each form raster and each form raster is deleted in accordance with the order from the low priority, thereby continuing the registering process of the form raster.

According to the further aspect of the present invention as described above, the apparatus in the first embodiment further comprises memory discriminating means for discriminating whether the form data has been stored in the form data memory means or not for a time during which the data to be printed is not received from the outside. In the case where it is determined by the memory discriminating means that the form data has been stored in the form data memory means, the form image forming means reads out the form data and forms the form image.

In the further aspect, the form image holding means in the above apparatus is constructed by the non-volatile memory means.

According to the second embodiment of the invention, therefore, in the case where the form data has been stored in the non-volatile device, the form image can be formed and encoded at the time of the turn-on of the power source or by using the free time during which the data to be printed is not received from the host, so that even the first print of the first page can be outputted at a high speed.

[Third Embodiment]

The first embodiment has been described with respect to the case of outputting the form image formed in the color mode. However, the ordinary color image processing apparatus is constructed so that the monochromatic mode and the color mode are switched and the image can be printed and the printing can be also performed by using only the Bk toner in the same apparatus. In such a case, since the page buffer is constructed by only the black plane, it is sufficient to set the mode flag of the application corresponding to the form image to "1".

On the other hand, in the case where the normal page (data to be overlaid) is a page of the color mode designation and the form image which has already been formed in the monochromatic mode is overlaid, the mode flag is set to "0". As mentioned above, even in the case where the form image is an image of the monochromatic mode, by switching the setting of the mode flag of the application corresponding to the form image in accordance with the mode of the normal page, the form overlay printing by the pre-rasterizing system can be performed.

The processes shown in the foregoing first to third embodiments are mainly processed by the CPU 601 and their programs can be realized even by a form of an external memory card. That is, it will be obviously understood that the invention is also accomplished by a construction such that a storage medium in which program codes of software to realize the functions of the embodiments mentioned above have been stored is supplied to a system or an apparatus and a computer (or CPU or MPU) of the system or apparatus reads out the program codes stored in the storage medium and executes them.

In this case, the program codes themselves read out from the storage medium realize the functions of the foregoing embodiments and the storage medium in which the program codes have been stored constructs the invention.

As a storage medium to supply the program codes, for example, it is possible to use any one of a floppy disk, a hard disk, an optical disk, a magnetooptic disk, a CD-ROM, a CD-R, a magnetic tape, a non-volatile memory card, an ROM, a DVD, and the like.

It will be obviously understood that the invention incorporates not only a case where the functions of the foregoing embodiments are realized by executing the read-out program codes by a computer but also a case where the OS (operating system) or the like which operates on the computer executes a part or all of the actual processes on the basis of instructions of the program codes and the functions of the foregoing embodiments are realized by those processes.

Further, it will be obviously understood that the invention also incorporates a case where after the program codes read out from the storage medium were written into a memory provided for a function expanding board inserted in a computer or a function expanding unit connected to the computer, a CPU or the like provided for the function expanding board or function expanding unit executes a part or all of the actual processes on the basis of instructions of the program codes, and the functions of the foregoing embodiments are realized by those processes.

Although the embodiments have been described with respect to the laser printer as an example, the invention is not limited to such an example but can be also applied to printers of any other types. However, as described in the embodiments, it is desirable to apply the invention to an apparatus of a high speed to a certain degree. In this meaning, it is desirable to apply the invention to a page printer represented by a laser printer or an LED printer as mentioned above.

As described above, according to the invention, the form can be outputted at a high speed irrespective of the contents of the form data. Particularly, in a print command of a plurality of pages such that the normal page differs every page for the form data of the same contents, the form data processing time of the second and subsequent pages can be set to almost 0.

Since there is no need to individually have the same drawing object every plural pages, a memory capacity which is required for the drawing objects of a plurality of pages can be totally suppressed. The reduction in processing speed such as a sheet ejection waiting or the like can be avoided.

According to the invention, in the case where the form data has been stored in a non-volatile device, the form image can be formed and coded at the time of the turn-on of the power source or by using the free time during which the data to be printed is not received from the host, so that the first print of the first page can be also outputted at a high speed.

According to the invention, the form image is formed, coded, and held every color plane on a unit basis of the band obtained by dividing one page into bands and is sequentially decoded at the time of the designation of the form overlay and, after that, the form image is read out and drawn into the band buffer. Therefore, the pre-process or skip reading process are unnecessary upon decoding, and the invention can be easily applied to the image processing apparatus for drawing the normal page data by the banding method.

According to the invention as described above, the form can be outputted at a high speed irrespective of the contents of the form data.

What is claimed is:

1. An image processing apparatus comprising:
   memory means having plane buffers to store a plurality of plane images;
   first drawing means for independently drawing image data into each plane buffer on the basis of a print command; and
   second drawing means for drawing the image data into the plane buffers in which the drawing is necessary and erasing data at the positions of said image data in the planes in which the drawing is unnecessary on the basis of a print command,
   wherein said first drawing means and said second drawing means are switched and the image data of one page is drawn.

2. An apparatus according to claim 1, further comprising:
   form image storage means for storing a form image developed on the basis of input form data; and
   control means for controlling in a manner such that said form image is drawn into said plane buffer by said first drawing means and print data which is written to a predetermined position of a form is drawn into said plane buffer by said second drawing means.

3. An image processing apparatus which can overlay-output form data of one page and print data which is written to a predetermined position of a form, comprising:
   form data memory means for storing said form data of at least one page;
   form image forming means for reading out the form data from said form data memory means and analyzing said form data and forming a form image of one page every plane;
   form image holding means for holding said form image of at least one page; and
   form drawing means for drawing the form image held in said form image holding means into an output memory of the corresponding plane,
   wherein image data is drawn into said output memory together with the form image on the basis of said print data.

4. An apparatus according to claim 3, further comprising:
   discriminating means for discriminating whether the form image corresponding to a form print command has been drawn and held in said form image holding means or not in the case where said form print command is instructed,
   and wherein
   when it is determined by said discriminating means that the corresponding form image has been held, the form image per plane is drawn onto said output memory of each corresponding plane by said form drawing means, and
   when it is decided by said discriminating means that the corresponding form image is not held, the form data is read out from said form data memory means and is analyzed and intermediate data of one page is formed by said form image forming means, and the form image is developed and drawn onto the output memory on the basis of the formed intermediate data.

5. An apparatus according to claim 4, wherein
   said form drawing means independently draws a form image into each plane of said output memory, and
   said form image forming means draws the image data into the planes in which the drawing is necessary in said memory and erases the data at the position of said form image in the planes in which the drawing is unnecessary on the basis of said intermediate data.

6. An apparatus according to claim 3, further comprising:
   coding means for coding a plurality of form images per said plane every plane, respectively; and
   decoding means for decoding said coded form images every plane,
   and wherein said form image holding means holds the coded form images.

7. An apparatus according to claim 3, further comprising memory discriminating means for discriminating whether the form data has been stored in said form data memory means or not for a time during which data to be printed is not received from the outside,
   and wherein when it is determined by said memory discriminating means that the form data has been stored in said form data memory means, said form image forming means reads out the form data and forms the form image.

8. An apparatus according to claim 3, wherein said form image forming means forms the form image in accordance with a form raster forming command which is instructed from the outside.

9. An apparatus according to claim 3, wherein said form image forming means forms said form image by a form obtained by dividing one page into bands, and said form image holding means collectively holds each of the divided form images as much as one page.

10. An apparatus according to claim 3, wherein said form image holding means is non-volatile memory means.

11. An apparatus according to claim 3, wherein said form image holding means is volatile memory means.

12. An apparatus according to claim 4, wherein before the print data is drawn into said output memory, said form drawing means sequentially reads out each of the form images held in said form image holding means and draws into the output memory per plane.

13. An apparatus according to claim 3, wherein said form data is constructed by a command group of a page description language format.

14. An apparatus according to claim 3, wherein said image processing apparatus is a color printer.

15. An image processing method of controlling an image processing apparatus having memory means having plane buffers to store a plurality of plane images, comprising:

a first drawing step of independently drawing image data into each plane buffer on the basis of a print command; and a second drawing step of drawing the image data into the plane buffers in which the drawing is necessary and erasing data at the positions of said image data in the planes in which the drawing is unnecessary on the basis of a print command, wherein the image data of one page is drawn by switching said first drawing step and said second drawing step.

16. A method according to claim 15, further comprising:

a form image storing step of storing a form image developed on the basis of input form data into form image storage means; and a control step of controlling in a manner such that said form image is drawn into said plane buffer in said first drawing step and print data which is written to a predetermined position of a form is drawn into said plane buffer in said second drawing step.

17. An image processing method of overlay-outputting form data of one page and print data which is written to a predetermined position of a form, comprising:

a form data storing step of storing said form data of at least one page into form data memory means;

a form image forming step of reading out the form data from said form data memory means and analyzing the form data and forming a form image of one page every plane;

a form image holding step of holding said form image of at least one page into said form image holding means; and a form drawing step of drawing the form image held in said form image holding means into an output memory of the corresponding plane, wherein image data is drawn into said output memory together with said form image on the basis of said print data.

18. A method according to claim 17, further comprising:

a discriminating step of discriminating whether the form image corresponding to a form print command has been drawn and held in said form image holding means or not in the case where said form print command is instructed, and wherein when it is determined in said discriminating step that the corresponding form image has been held, the form image per plane is drawn onto said output memory of each corresponding plane in said form drawing step, and when it is decided in said discriminating step that the corresponding form image is not held, the form data is read out from said form data memory means and is analyzed and intermediate data of one page is formed in said form image forming step, and the form image is developed and drawn onto the output memory on the basis of the formed intermediate data.

19. A method according to claim 18, wherein in said form drawing step, a form image is independently drawn into each plane of said output memory, and in said form image forming step, the image data is drawn into the planes in which the drawing is necessary in said output memory and the data at the position of said form image in the planes in which the drawing is unnecessary is erased on the basis of said intermediate data.

20. A method according to claim 17, further comprising:

a coding step of coding a plurality of form images per said plane every plane, respectively; and a decoding step of decoding said coded form images every plane, and wherein in said form image holding step, the coded form images are held in said form image holding means.

21. A method according to claim 17, further comprising a memory discriminating step of discriminating whether the form data has been stored in said form data memory means or not for a time during which data to be printed is not received from the outside, and wherein when it is determined in said memory discriminating step that the form data has been stored in said form data memory means, in said form image forming step, the form data is read out and the form image is formed.

22. A method according to claim 17, wherein in said form image forming step, the form image is formed in accordance with a form raster forming command which is instructed from the outside.

23. A method according to claim 17, wherein in said form image forming step, said form image is formed by a form obtained by dividing one page into bands, and said form image holding means collectively holds each of the divided form images as much as one page.

24. A method according to claim 17, wherein said form image holding means is non-volatile memory means.

25. A method according to claim 17, wherein said form image holding means is volatile memory means.

26. A method according to claim 18, wherein in said form drawing step, before the print data is drawn into said output memory, each of the form images held in said form image holding means is sequentially read out and drawn into the output memory per plane.

27. A method according to claim 17, wherein said form data is constructed by a command group of a page description language format.

28. A storage medium in which a program for controlling an image processing apparatus having memory means having plane buffers to store a plurality of plane images has been stored, wherein said program comprises:

a first drawing step of independently drawing image data into each plane buffer on the basis of a print command; and a second drawing step of drawing the image data into the plane buffers in which the drawing is necessary and erasing data at the positions of the image data in the planes in which the drawing is unnecessary on the basis of a print command, and the image data of one page is drawn by switching said first drawing step and said second drawing step.

29. A storage medium in which a program for controlling an image processing apparatus to overlay-output form data of one page and print data which is written to a predetermined position of a form has been stored, wherein said program comprises:

a form data storing step of storing said form data of at least one page into form data memory means;

a form image forming step of reading out the form data from said form data memory means and analyzing said form data and forming a form image of one page every plane;

a form image holding step of holding said form image of at least one page into form image holding means; and a form drawing step of drawing the form image held in said form image holding means into an output memory of the corresponding plane, and image data is drawn into said output memory together with said form image on the basis of said print data.

* * * * *